US006931445B2

(12) United States Patent
Davis

(10) Patent No.: US 6,931,445 B2
(45) Date of Patent: Aug. 16, 2005

(54) USER INTERFACE FOR MONITORING REMOTE DEVICES

(75) Inventor: James S. Davis, Woodstock, GA (US)

(73) Assignee: StatSignal Systems, Inc., Atlanta, GA (US)

( * ) Notice: Subject to any disclaimer, the term of this patent is extended or adjusted under 35 U.S.C. 154(b) by 201 days.

(21) Appl. No.: 10/369,417

(22) Filed: Feb. 18, 2003

(65) Prior Publication Data

US 2004/0162902 A1 Aug. 19, 2004

(51) Int. Cl.[7] .............................................. G06F 15/173
(52) U.S. Cl. ....................................... 709/224; 702/62
(58) Field of Search ........................... 709/224; 702/62; 340/870.11

(56) References Cited

U.S. PATENT DOCUMENTS

| | | | | |
|---|---|---|---|---|
| 6,327,541 B1 | * | 12/2001 | Pitchford et al. | 702/62 |
| 6,437,692 B1 | * | 8/2002 | Petite et al. | 340/540 |
| 6,509,841 B1 | * | 1/2003 | Colton et al. | 340/870.11 |
| 6,747,571 B2 | * | 6/2004 | Fierro et al. | 340/870.02 |
| 6,836,737 B2 | * | 12/2004 | Petite et al. | 702/62 |

* cited by examiner

*Primary Examiner*—Mehmet B. Geckil
(74) *Attorney, Agent, or Firm*—Thomas, Kayden, Horstemeyer & Risley, LLP

(57) ABSTRACT

A system for monitoring utility consumption information, the system including a memory to store utility consumption information and a processor configured by the memory to provide a user interface to enable an user to view the utility consumption information in a time-segmented fashion.

25 Claims, 21 Drawing Sheets

USER INTERFACE FOR MONITORING REMOTE DEVICES

BACKGROUND OF THE INVENTION

1. Field of the Invention

The present invention generally relates to remotely operated systems, and more particularly to a computerized system for monitoring remote systems by transferring information signals through a wide area network (WAN) and using software applications hosted on a connected server to generate the information for display.

2. Discussion of the Related Art

As is known, there are a variety of systems for monitoring and controlling manufacturing processes, inventory systems, emergency control systems, and the like. Most automatic systems use remote sensors and controllers to monitor and automatically respond to system parameters to reach desired results. A number of control systems utilize computers to process system inputs, model system responses, and control actuators to implement process corrections within the system. Both the electric power generation and metallurgical processing industries have had success controlling production processes by implementing computer controlled control systems in individual plants.

One way to classify control systems is by the timing involved between subsequent monitoring occurrences. Monitoring processes can be classified as aperiodic or random, periodic, and real-time. A number of remotely distributed service industries implement the monitoring and controlling process steps through manual inspection and intervention.

Aperiodic monitoring systems (those that do not operate on a predetermined cycle) are inherently inefficient as they require a service technician to physically traverse an area to record data, repair out of order equipment, add inventory to a vending machine, and the like. Such service trips are carried out in a number of industries with the associated costs being transferred to the consumers of the service.

Conversely, utility meter monitoring, recording, and client billing are representative of a periodic monitoring system. In the past, utility providers sent a technician from meter to meter on a periodic basis to verify meter operation and to record utility use. One method of cutting operating expenses in the utility industry involved increasing the period at which manual monitoring and meter data recording was performed. While this method decreased the monitoring and recording expense associated with more frequent meter observation and was convenient for consumers who favor the consistent billed amounts associated with "budget billing," the utility provider retained the costs associated with less frequent meter readings and the processing costs associated with reconciling consumer accounts. As well, less frequent meter readings mean that consumers are informed of actual usage on a less frequent basis. This prevents consumers from being able to adjust consumption as well as possibly avoid activities that are wasteful.

Lastly, certain environmental and safety systems may require constant or real-time monitoring. Heating, ventilation, and air-conditioning systems, fire reporting and damage control systems, alarm systems, and access control systems are representative systems that utilize real-time monitoring and often require immediate feedback and control. In that real time systems are not particularly relevant to the present disclosure, they will not be further addressed.

Accordingly, an alternative solution to applying monitoring solutions to distributed systems that overcomes the shortcomings of the prior art is desired.

SUMMARY OF THE INVENTION

Certain objects, advantages and novel features of the invention will be set forth in part in the description that follows and in part will become apparent to those skilled in the art upon examination of the following, or may be learned with the practice of the invention. The objects and advantages of the invention may be realized and obtained by means of the instrumentalities and combinations particularly pointed out in the appended claims.

To achieve the advantages and novel features, the present invention is generally directed to a cost effective method of monitoring remote devices. More specifically, the present invention is directed to a computerized system for monitoring remote systems and system information transfer by transmitting information signals to a WAN gateway interface and using applications on a connected server to process the information. Because the applications server is integrated on a WAN, Web browsers can be used by anyone with Internet access (and the appropriate access permissions) to view and download the recorded data.

In accordance with a broad aspect of the invention, a system for monitoring utility usage information is provided. The system includes a memory to store utility consumption information and a processor configured by the memory to provide a user interface to enable a user to view the utility consumption information in a time-segmented fashion.

In one embodiment, a client retrieves configured system data by accessing an Internet Web site. In such an embodiment, a system consistent with the present invention acts as a data collector and formatter with data being delivered upon client request, with availability twenty-four hours a day, seven days a week.

It should be further appreciated that the information transmitted and received by the wireless transceivers may be further integrated with other data transmission protocols for transmission across telecommunications and computer networks other than the Internet. In addition, it should be further appreciated that telecommunications and computer networks other than the Internet can function as a transmission path between the networked wireless transceivers, the local gateways, and the central server.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
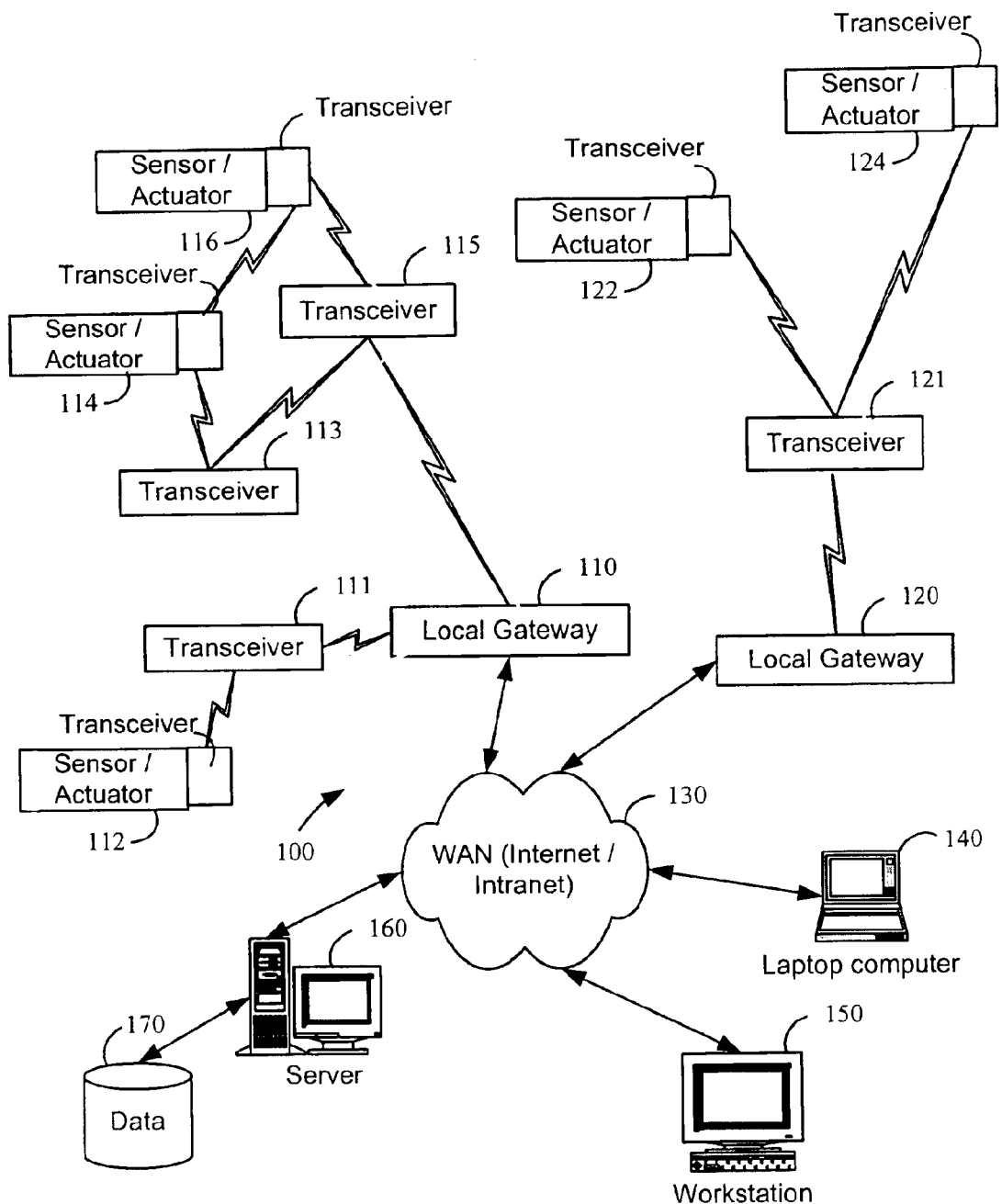
FIG. 1 is a block diagram illustrating a monitoring system of the present invention.

Reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Reference is now made to FIG. 1, which is a block diagram that illustrates an example of a monitoring system in accordance with the present invention. In depth discussions of various aspects of the monitoring system are not necessary to disclose the present invention, therefore, these aspects will not be addressed in depth herein. Rather, greater detail with regard to the monitoring system 100 can be found in U.S. application Ser. No. 09/439,059, which is incorporated herein by reference in its entirety. Monitoring system 100 consists of one or more sensor/actuators 112, 114, 116, 122, and 124 each integrated with a transceiver. The transceivers are preferably RF (Radio Frequency) transceivers that are relatively small in size and transmit a relatively low power RF signal. As a result, in some applications, the transmission range of a given transceiver may be relatively limited. As will be appreciated from the description that follows, this relatively limited transmission range of the transceivers is an advantageous and desirable characteristic of monitoring system 100. Although the transceivers are depicted without a user interface such as a keypad, in certain embodiments of the invention the transceivers may be configured with user selectable buttons or an alphanumeric keypad. Often, the transceivers will be electrically interfaced with a sensor or actuator, such as a smoke detector, a thermostat, a security system, etc., where external buttons are not needed.

Monitoring system 100 also includes a plurality of stand-alone transceivers 111, 113, 115, and 121. Each stand-alone transceiver 111, 113, 115, and 121 and each of the integrated transceivers 112, 114, 116, 122, and 124 may be configured to receive an incoming RF transmission (transmitted by a remote transceiver) and to transmit an outgoing signal. This outgoing signal may be another low power RF transmission signal, a higher power RF transmission signal, or alternatively may be transmitted over a conductive wire, fiber optic cable, or other transmission media. It will be appreciated by those skilled in the art that integrated transceivers 112, 114, 116, 122, and 124 can be replaced by RF transmitters (not shown) for client specific applications that require data collection only.

Local gateways 110 and 120 are configured and disposed to receive remote data transmissions from the various stand-alone transceivers 111, 113, 115, and 121 or integrated transceivers 112, 114, 116, 122, and 124 having an RF signal output level sufficient to adequately transmit a formatted data signal to the gateways. Local gateways 110 and 120 analyze the transmissions received, convert the transmissions into TCP/IP format and further communicate the remote data signal transmissions via WAN 130. In this regard, and as will be further described below, local gateways 110 and 120 may communicate information, service requests, control signals, etc., to remote sensor/actuator transceiver combinations 112, 114, 116, 122, and 124 from server 160, laptop computer 140, and workstation 150 across WAN 130. Server 160 can be further networked with database server 170 to record client specific data.

It will be appreciated by those skilled in the art that if an integrated transceiver (either of 112, 114, 116, 122, and 124) is located sufficiently close to local gateways 110 or 120 such that its RF output signal can be received by a gateway, the RF data signal need not be processed and repeated through stand-alone transceivers 111, 113, 115, or 121.

Figure 5:
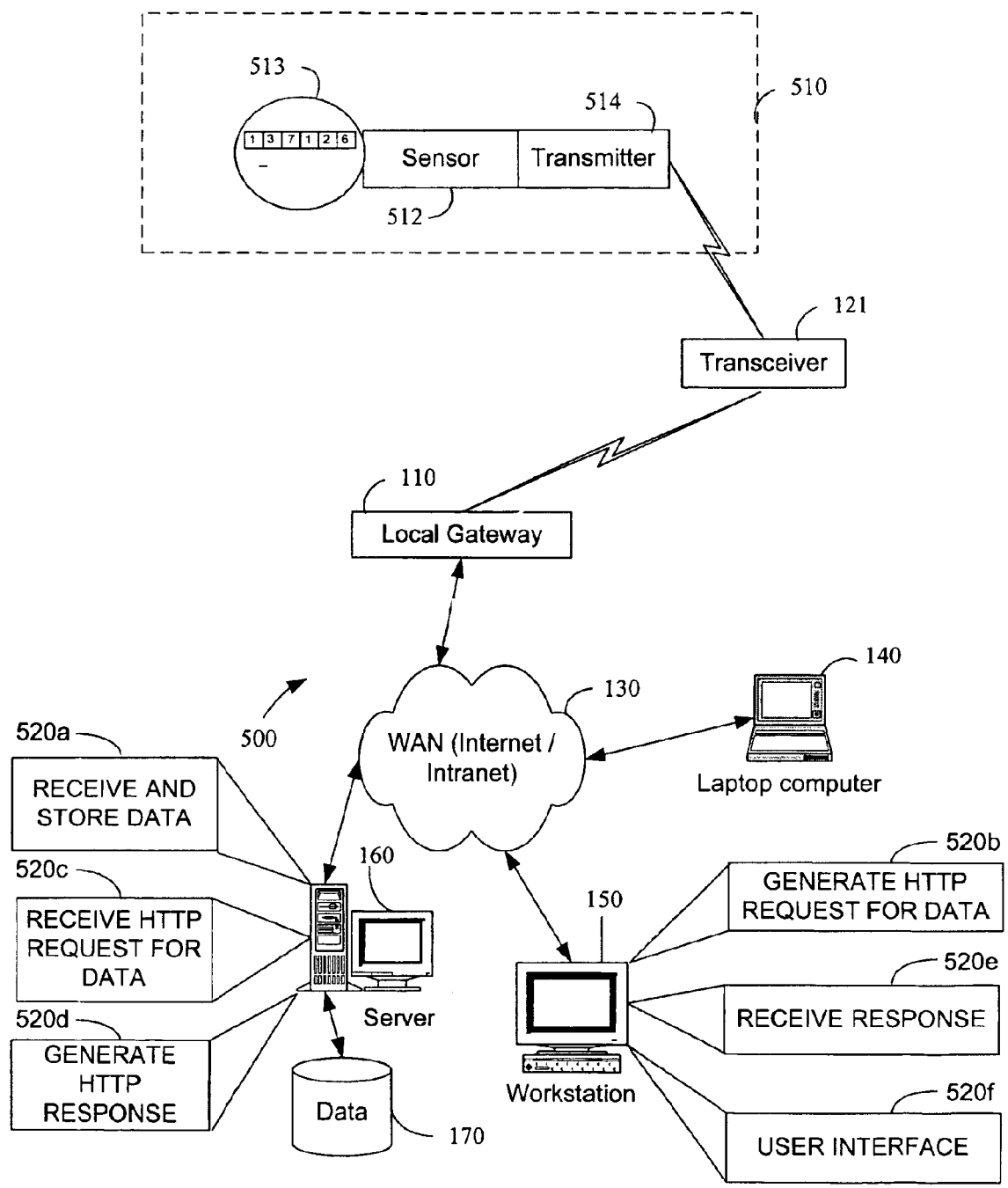
FIG. 5 is a block diagram illustrating a client specific application in accordance with the invention (data monitoring)

It will be further appreciated that a monitoring system constructed in accordance with the teachings of the present invention may be used in a variety of environments. In accordance with a preferred embodiment, a monitoring system such as that illustrated in FIG. 1 may be employed to monitor and record utility usage (electricity, water, gas, etc.) by residential and industrial customers as illustrated in FIG. 5.

As will be further appreciated from the discussion herein, transceivers 112, 114, 116, 122, and 124 may have substantially identical construction (particularly with regard to their internal electronics), which provides a cost effective implementation at the system level. Furthermore, a plurality of stand-alone transceivers 111, 113, 115, and 121, which may be identical, are disposed in such a way that adequate coverage in an industrial plant or community is provided.

Preferably, stand-alone transceivers 111, 113, 115, and 121 may be dispersed sufficient that only one stand-alone transceiver will pick up a transmission from a given integrated transceiver 112, 114, 116, 122, and 124 (due in part to the low power transmission nature of each transmitter). However, in certain instances two, or even more, stand-alone transceivers may pick up a single transmission. Thus, the local gateways 110 and 120 may receive multiple versions of the same data transmission signal from an integrated transceiver, but from different stand-alone transceivers. Due to the transmitting device identification that is incorporated into the transmitted signal, duplicative transmissions (e.g., transmissions duplicated to more than one gateway, or to the same gateway, more than once) may be ignored or otherwise appropriately handled.

The advantage of integrating a transceiver, as opposed to a one-way transmitter, into a monitoring device relates to the ability of the transceiver to receive incoming control signals, as opposed to merely transmitting data signals. Significantly, local gateways 110 and 120 may communicate with all system transceivers. Since local gateways 110 and 120 are permanently integrated with WAN 130, server 160 can host application specific software, which was typically hosted in an application specific local controller.

In one embodiment, server 160 collects, formats, and stores client-specific data from each of the integrated transceivers 112, 114, 116, 122, and 124 for later retrieval or access from workstation 150 or laptop 140. In this regard, workstation 150 or laptop 140 can be used to access the stored information through a Web browser. In another embodiment, server 160 may perform the additional functions of hosting application-specific control system functions and replacing the local controller by generating required control signals for appropriate distribution via WAN 130 and local gateways 110 and 120 to the system actuators. In a third embodiment, clients may elect for proprietary reasons to host control applications on their own WAN connected workstation. In this regard, database 170 and server 160 may act solely as a data collection and reporting device with client workstation 150 generating control signals for the system.

It will be appreciated by those skilled in the art that the information transmitted and received by the wireless transceivers of the present invention may be further integrated with other data transmission protocols for transmission across telecommunications and computer networks other than the Internet. In addition, it should be further appreciated that telecommunications and computer networks other than the Internet can function as a transmission path between the networked wireless transceivers, the local gateways, and the central server.

Figure 2:
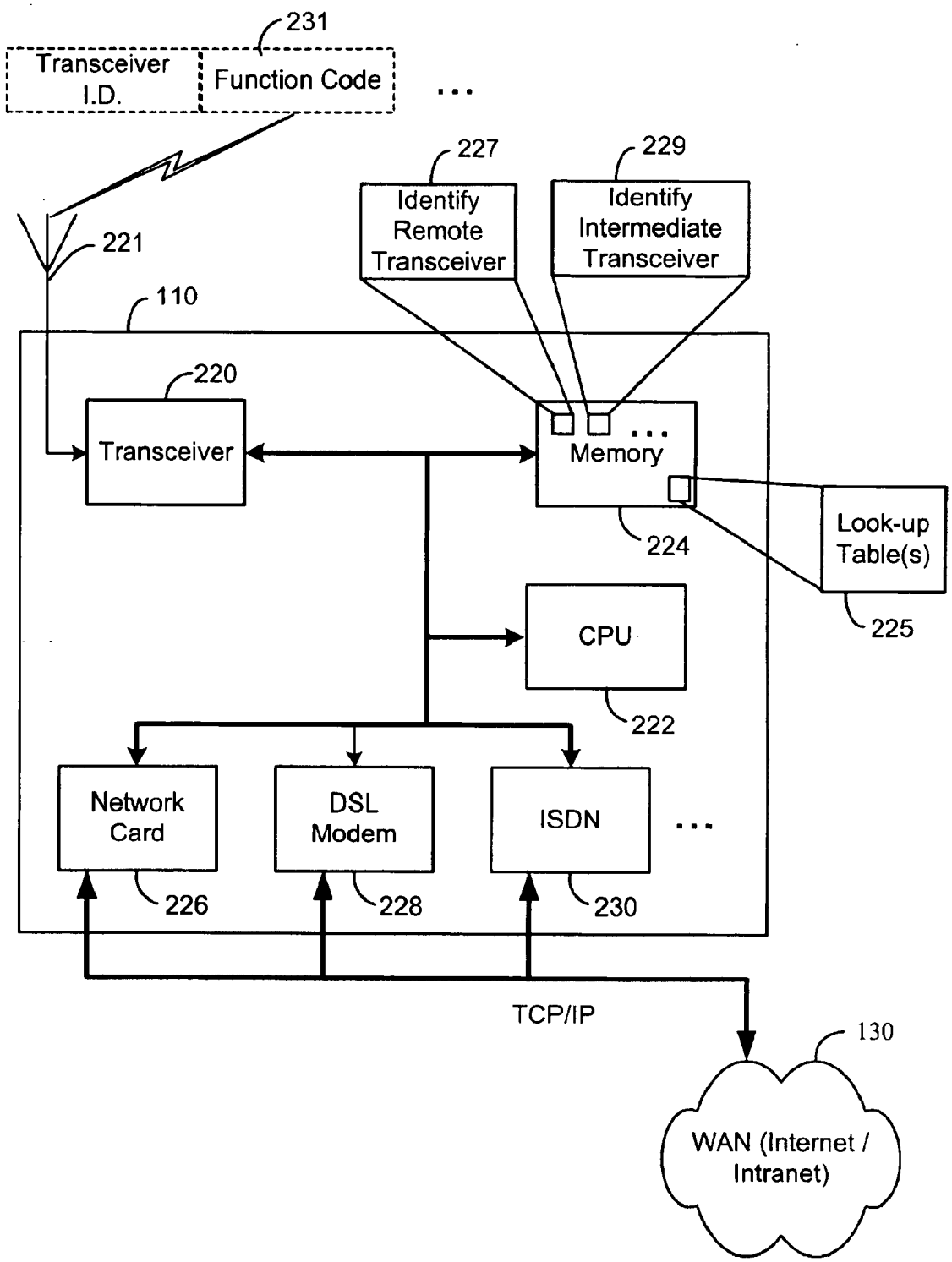
FIG. 2 is a functional block diagram that illustrates the functional components of a local WAN gateway constructed in accordance with the invention.

Reference is now made to FIG. 2, which is a block diagram illustrating certain principal components and the operation of a local gateway 110 of a monitoring system 100 (see FIG. 1) constructed in accordance with the present invention. The primary physical components that may be provided within local gateway 110 are a transceiver 220, a CPU 222, a memory 224, a network card 226, a DSL modem 228, an ISDN card 230, as well as other components not illustrated in the FIG. 2 that would enable a TCP/IP connection to WAN 130. The transceiver 220 is configured to receive incoming signals consistently formatted in the convention previously described. Local gateway 110 may be configured such that memory 224 includes look up table 225 to assist in identifying the remote and intermediate transceivers used in generating and transmitting the received data transmission. Program code within the memory 224 may also be provided and configured for controlling the operation of a CPU 222 to carry out the various functions that are orchestrated and/or controlled by local gateway 110. For example, memory 224 may include program code for controlling the operation of the CPU 222 to evaluate an incoming data packet to determine what action needs to be taken. In this regard, look-up tables 225 may also be stored within memory 224 to assist in this process. Furthermore, memory 224 may be configured with program code configured to identify a remote transceiver 227 or identify an intermediate transceiver 229. Function codes, transmitter and or transceiver identification numbers, may all be stored with associated information within look-up tables 225.

Thus, one look-up table may be provided to associate transceiver identification numbers with a particular user. Another look up table may be used to associate function codes with the interpretation thereof. For example, a unique code may be associated by a look-up table to identify which utility-monitoring device is providing usage data. In connection with the look-up tables 225, memory 224 may also include a plurality of code segments that are executed by CPU 222, and which largely control the operation of the computer. For example, a first data packet segment may be provided to access a first look-up table to determine the identity of the transceiver which transmitted the received message. A second code segment may be provided to access a second look-up table to determine the proximate location of the message generating transceiver, by identifying the transceiver that relayed the message. Consistent with the invention, additional, fewer, or different code segments may be provided to carryout different functional operations and data signal transfers throughout the transceiver network.

The local gateway 110 may also include one or more mechanisms through which to communicate with remote systems. For example, the gateway may include a network card 226, which would allow the gateway 110 to communicate across a local area network to a network server, which in turn may contain a backup gateway to WAN 130. Alternatively, local gateway 110 may contain a DSL modem 228, which may be configured to provide a direct dial link to a remote system, by way of the PSTN. Alternatively, local gateway 110 may include an ISDN card 230 configured to communicate via an ISDN connection with a remote system. Other communication gateways may be provided as well to serve as primary and or backup links to WAN 130 or to local area networks that might serve to permit local monitoring of gateway health and data packet control.

Figure 3:
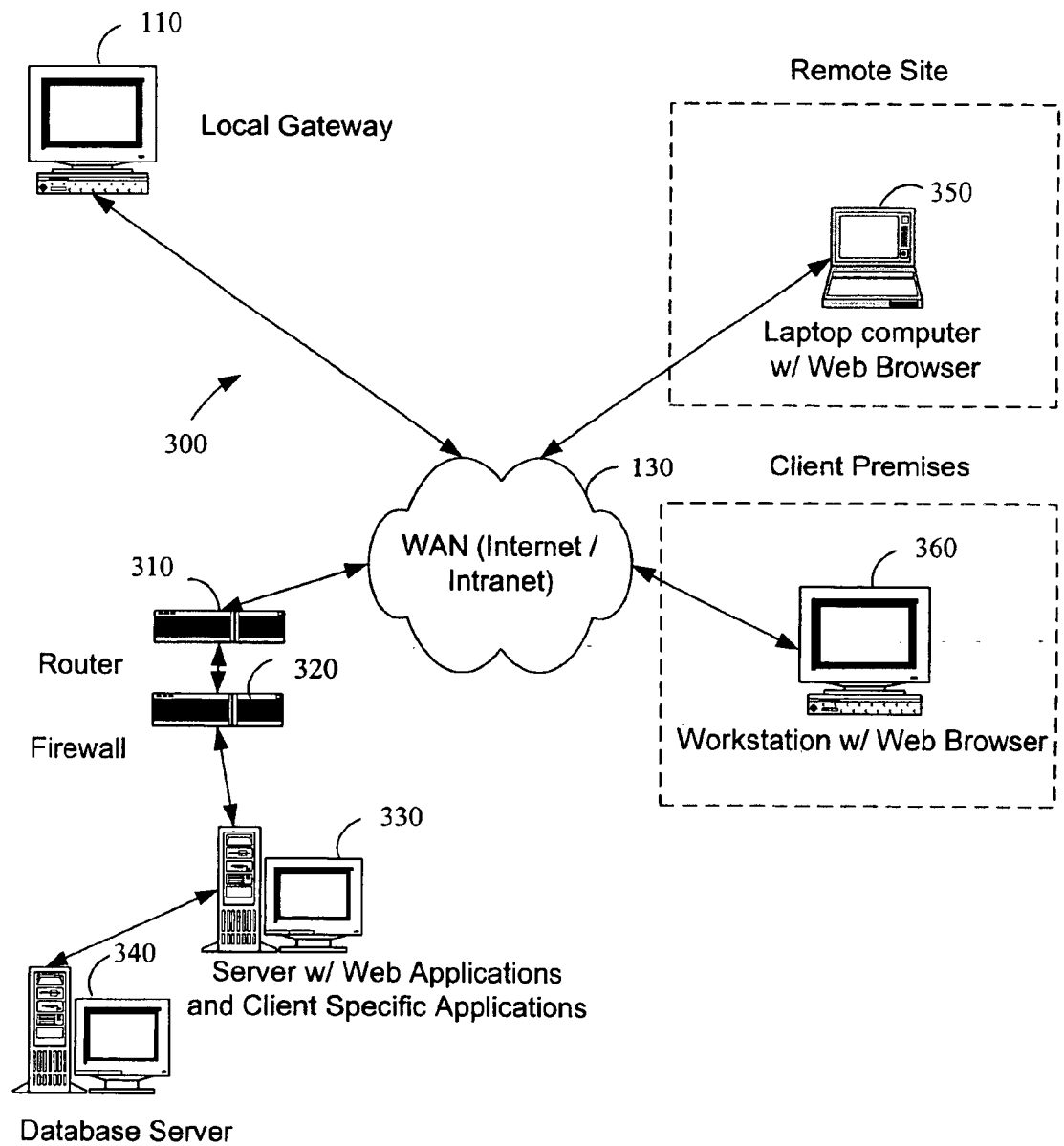
FIG. 3 is a diagram illustrating WAN connectivity in a system constructed in accordance with the invention.

Reference is now made to FIG. 3, which is a diagram illustrating WAN connectivity in a system constructed in accordance with the invention. In this regard, local gateway 110 is configured to transmit control signals and receive data signals using the open data packet protocol. Local gateway 110 is preferably interconnected permanently on WAN 130 and configured to translate received data signals for WAN transfer via TCP/IP. A server 330 configured with Web applications and client-specific applications as required is connected to WAN 130 via router 310 and further protected and buffered by firewall 320. Consistent with an embodiment of the present invention, server 330 is assisted in its task of storing and making available client specific data by database server 340. A workstation 360 configured with a Web browser is connected to WAN 130 at client premises by any suitable means known by those of skill in the art. Alternatively, clients may access WAN 130 via remote laptop 350 or other devices configured with a compatible Web browser. In this way, server 330 may provide client-specific data upon demand.

Figure 4:
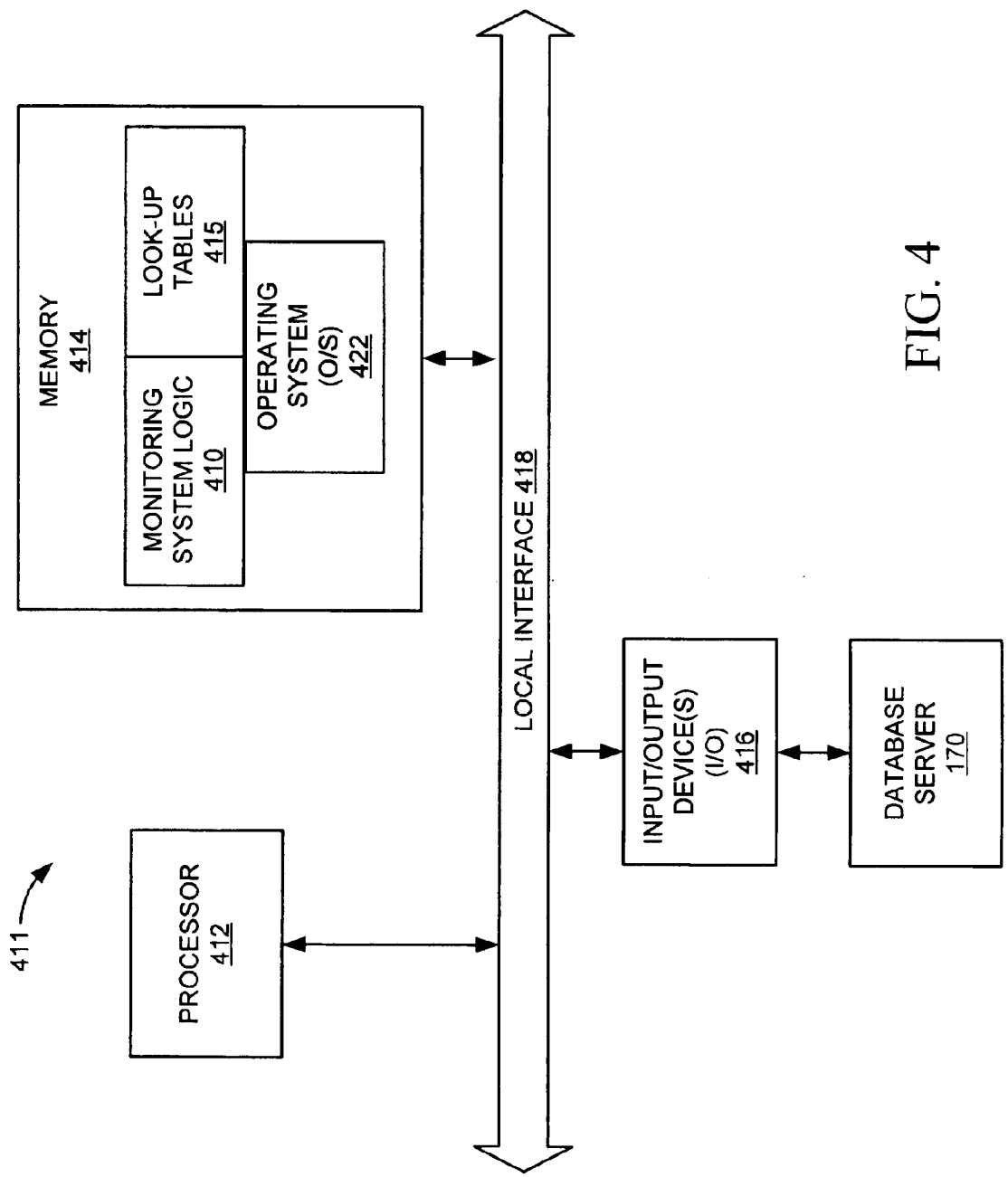
FIG. 4 is a block diagram illustrating the functional components of a web server constructed in accordance with the invention.

One of ordinary skill in the art will appreciate that the logic of the monitoring system according to the present invention may be implemented in hardware, software, firmware, or a combination thereof. In the currently contemplated best mode, the monitoring system logic is implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer that can implement the monitoring system logic of the present invention is shown in FIG. 4. In FIG. 4, the monitoring system logic is denoted by reference numeral 410. As well, in the preferred embodiment, the monitoring system logic 410 resides within a Web server 160 (FIG. 1). However, embodiments are envisioned wherein the monitoring system logic 410 resides, in whole or in part, within memory remote from the Web server 160, such as memory present in workstation 150 or laptop computer 140 (FIG. 1).

Generally, in terms of hardware architecture, as shown in FIG. 4, the computer 411 includes a processor 412, memory 414, and one or more input and/or output (I/O) devices 416 (or peripherals) that are communicatively coupled via a local interface 418. The local interface 418 can be, for example but not limited to, one or more buses or other wired or wireless connections, as is known in the art. The local interface 418 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 412 is a hardware device for executing software, particularly that stored in memory 414. The processor 412 can be any custom made or commercially-available processor, a central processing unit (CPU), an auxiliary processor among several processors associated with the computer 411, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 414 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 414 may incorporate electronic, magnetic, optical, and/or other types of storage media. Note that the memory 414 can have a distributed architecture, where various components are situated remote from one another, but can be accessed by the processor 412.

The software in memory 414 may include one or more separate programs, each of which comprises an ordered listing of executable instructions for implementing logical functions. In the example of FIG. 4, the software in the memory 414 includes the monitoring system logic in accordance with the present invention and a suitable operating system (O/S) 422. A nonexhaustive list of examples of suitable commercially available operating systems 22 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 422 essentially controls the execution of other computer programs, such as the monitoring system logic 410, and provides scheduling, input-output control, file and data management, memory management, and communication control and related services.

The monitoring system logic 410 is a source program, executable program (object code), script, or any other entity comprising a set of instructions to be performed. When a source program, then the program needs to be translated via a compiler, assembler, interpreter, or the like, which may or may not be included within the memory 414, so as to operate properly in connection with the O/S 422. Furthermore, the monitoring system logic 410 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 416 may include input devices, for example but not limited to, a keyboard, mouse, scanner, microphone, etc. Furthermore, the I/O devices 416 may also include output devices, for example but not limited to, a printer, display, etc. Finally, the I/O devices 416 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 411 is a PC, workstation, or the like, the software in the memory 414 may further include a basic input output system (BIOS) (omitted for simplicity). The BIOS is a set of essential software routines that initialize and test hardware at startup, start the O/S 422, and support the transfer of data among the hardware devices. The BIOS is stored in ROM so that the BIOS can be executed when the computer 411 is activated.

When the computer 411 is in operation, the processor 412 is configured to execute software stored within the memory 414, to communicate data to and from the memory 414, and to generally control operations of the computer 411 pursuant to the software. The monitoring system logic 410 and the O/S 422, in whole or in part, but typically the latter, are read by the processor 412, perhaps buffered within the processor 412, and then executed.

When the monitoring system logic 410 is implemented in software, as is shown in FIG. 4, it should be noted that the monitoring system logic 410 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The monitoring system logic 410 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the monitoring system logic 410 is implemented in hardware, the monitoring system logic can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Having described the control system of FIG. 1, reference is now made to FIG. 5, which illustrates a specific monitoring embodiment consistent with application of the invention. More specifically, FIG. 5 illustrates a remote utility meter monitoring system 500. Remote utility meter subsystem 510 consists of utility meter 513 and an appropriately integrated sensor 512 wherein the current utility meter operational status and current utility meter usage total is transmitted via functional codes along with a transceiver identification code in a manner previously described by transmitter 514 to stand-alone transceiver 121. Stand-alone transceiver 121 further processes and transmits the encoded data to local gateway 110 which translates the data packet information into TCP/IP format for transfer across WAN 130 to server 160. Server 160 collects and formats the utility meter information for viewing and or retrieval upon client demand. Embodiments are envisioned wherein server 160 is operated and maintained by a utility provides and/or a third party.

As well, FIG. 5 illustrates various software modules 520a-f that perform separate functionality or subroutines within a single software module. In the embodiment shown, workstation 150 includes functionality for providing generation of HTTP requests for data 520b, receipt of response to the request 520e, and display of requested data by way of user interface 520f. The user interface software 520f allows a user to request and receive utility consumption data in a user friendly format. The Web server 160 includes functionality for receipt and storage of data 520a, receipt of HTTP requests for data 520c, and generation of HTTP responses to the requests 520d. As shown, a user at workstation 150 generates a request for data 520b. Upon receiving the request for data 520c, server 160 generates a response to the request 520d that includes the data desired by the user. Upon receipt of the response 520e at the workstation 150, the user interface module 520f performs the functionality of displaying the data to the user in a time-segmented fashion via a user interface. The process of accessing data is described in greater detail in reference to FIG. 6. In other embodiments, one or more functionalities described as being resident in workstation 150 can be implemented in whole or in part at the server 160. More specifically, embodiments are envisioned wherein the functionality for the display of the requested data by way of a user interface 520f is resident within the server 160.

Figure 6:
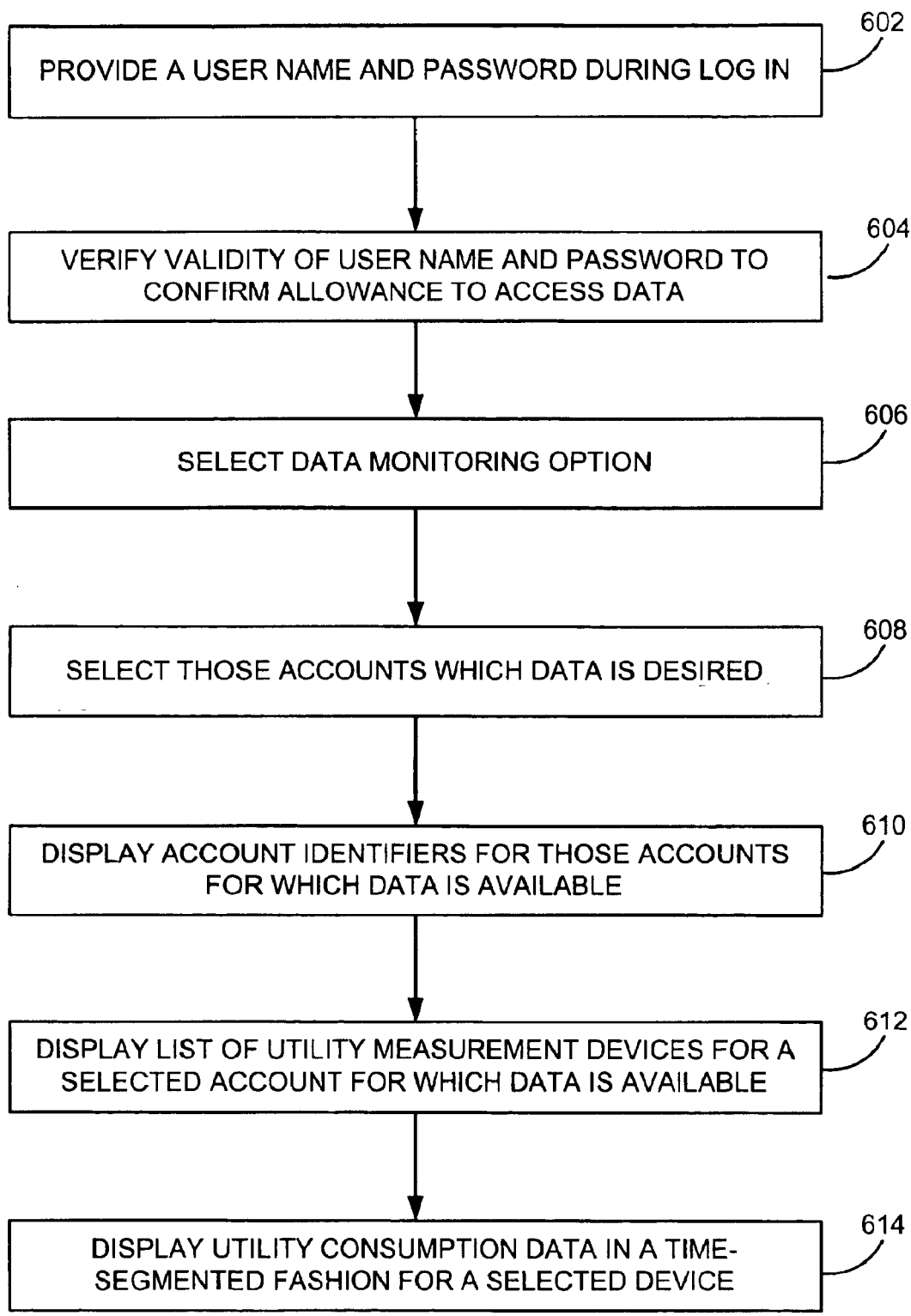
FIG. 6 is flow chart illustrating one example of accessing utility consumption data in accordance with a preferred embodiment of the present invention.

FIG. 6 is a flow chart illustrating the architecture, functionality, and operation of one example (nonlimiting example) of accessing utility consumption data using a preferred embodiment of the monitoring system 100 of the present invention. With regard to the flow chart of FIG. 6, each block represents a module, segment, or portion of code, which comprises one or more executable instructions for implementing the specified logical function(s). It should also be noted that in some of the alternate implementations, the functions noted in the blocks may occur out of the order noted. For example, two blocks shown in succession may in fact be executed substantially concurrently, where the blocks may sometimes be executed in the reference order, depending on the functionality involved.

Figure 7:
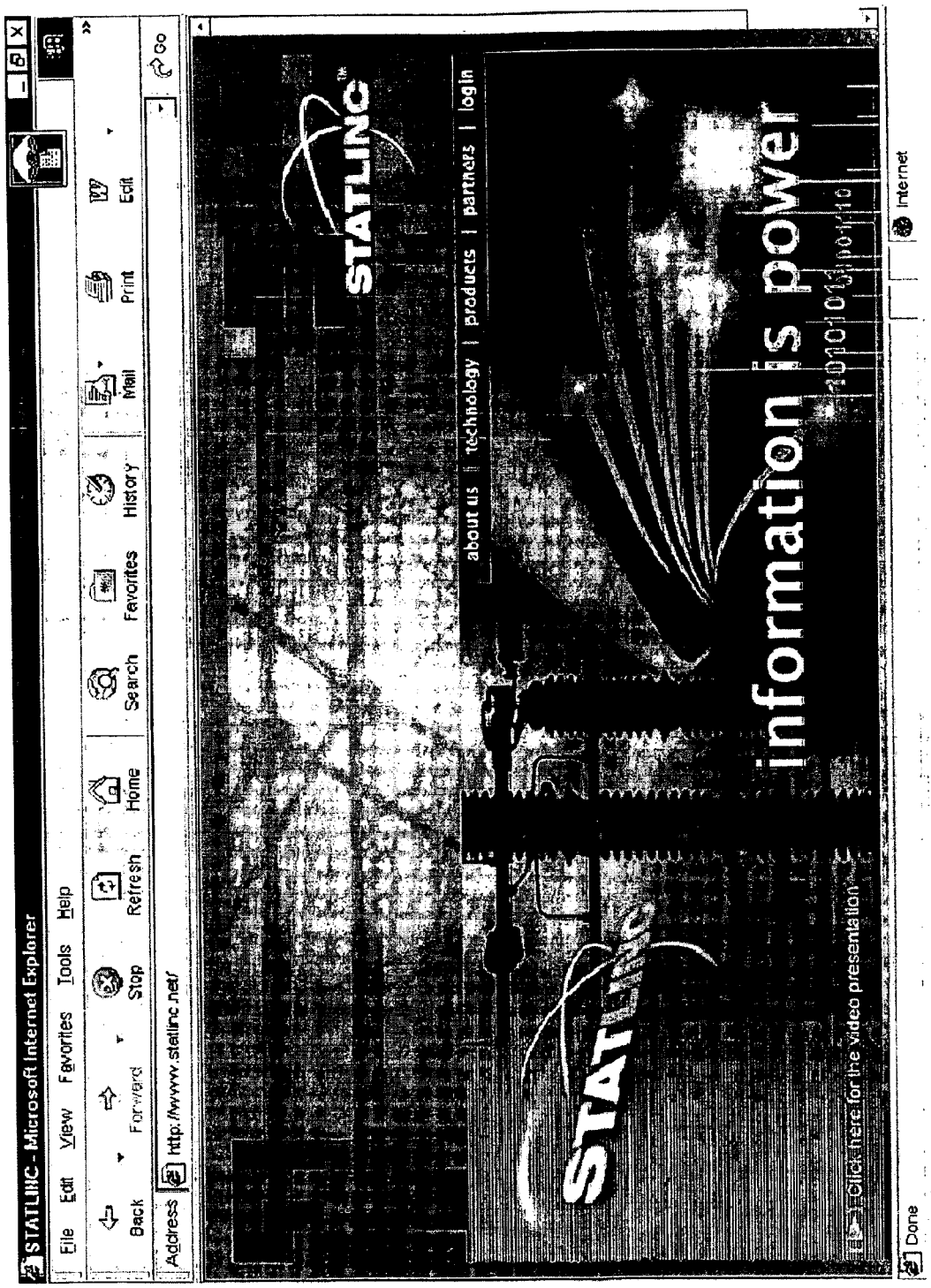
FIG. 7 is a screen view illustrating an example of a welcome screen view that is displayed upon accessing a web site including the present invention.
Figure 8:
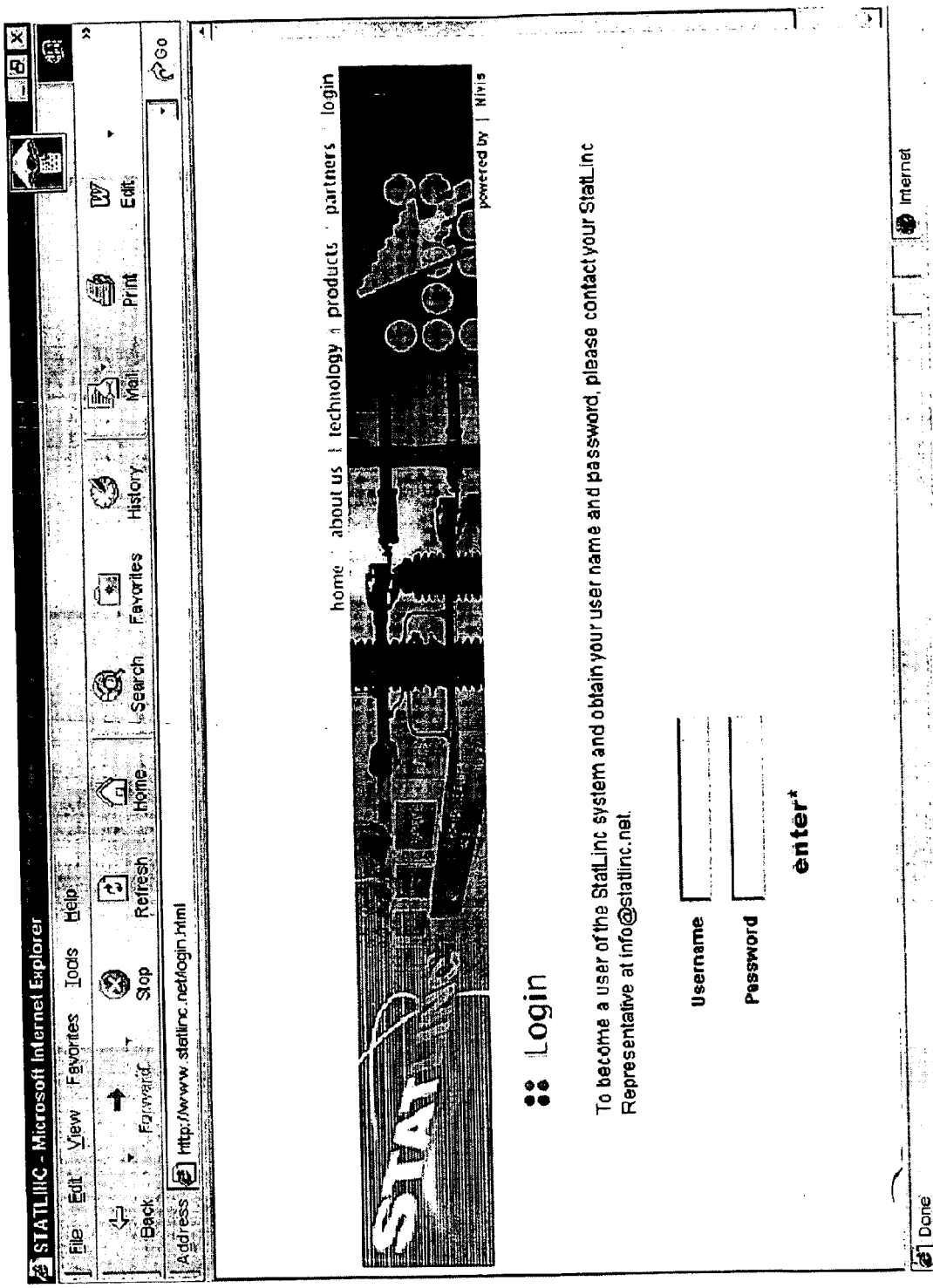
FIG. 8 is a screen view that illustrates an example of an initial log in screen view wherein information fields for accessing utility consumption data are shown.

As shown by block 602, for a user to access the monitoring system 100, the user first selects the log in feature displayed on a welcome screen as shown by FIG. 7. After having selected the log in feature, preferably, the user is required to provide both a user name and password. FIG. 8 provides an example of an initial log in screen view wherein fields for the entry of a user name and password are presented.

As shown by block 604, when an user submits a user name and password, the monitoring system 100, via the operational system 422 of FIG. 4, determines whether the user has submitted a valid user name and password. Preferably, the operating system 422 determines user validity by searching a look-up table 415 stored in either memory 414 or the web server database 170.

Figure 9:
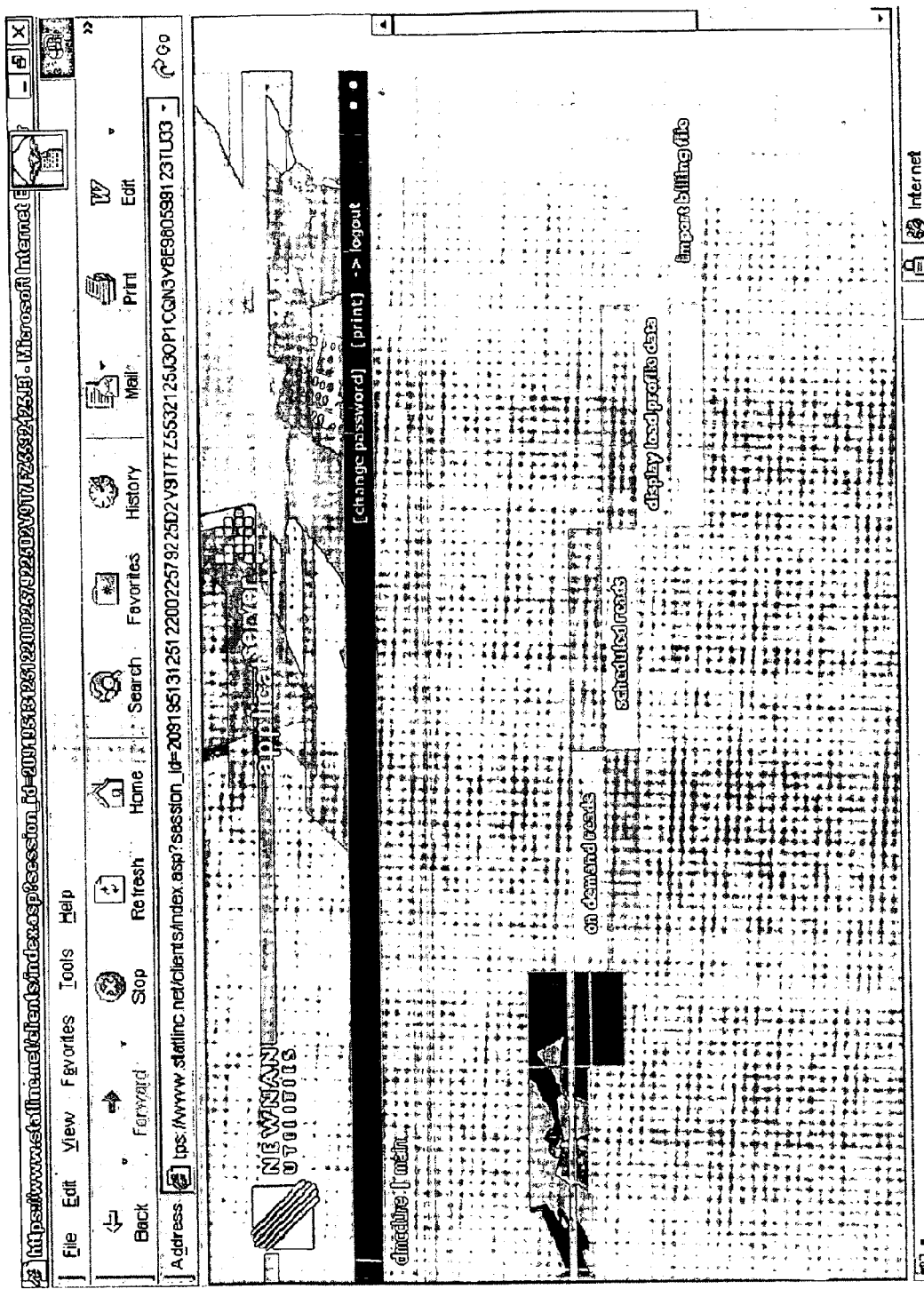
FIG. 9 is a screen view that illustrates various data viewing options of the present invention.

As shown by block 606, if a user provides a valid user name and password, the user is then allowed to select from a number of system options for viewing data. FIG. 9 is an example of a screen view that illustrates the data viewing options. In the present example, the options include, but are not limited to: on demand reads; schedule reads; display load profile reads; import billing files; change password; print; and log out. "On demand reads" provide tabular reports including the most recently collected data, meaning reports that include the most recent data received as of the day of the request can be obtained. "Scheduled reads" provide tabular reports up to the last whole day prior to the day on which the user is making a request. The "display load profile data" option provides reports including utility consumption data in bar graph form. The "import billing file" option provides a total sum reading of a utility usage measuring device, such as an electric meter, as of the most recently received data. The "change password," "print," and "log out" options are self-explanatory and need not be addressed herein. As well, only the display load profile and scheduled read options will be addressed herein because a detailed discussion of all existing options is not necessary to disclose the present invention. Also note, the aforementioned options and the following descriptions are only exemplary and in no one limit the operation of the present invention.

Figure 10:
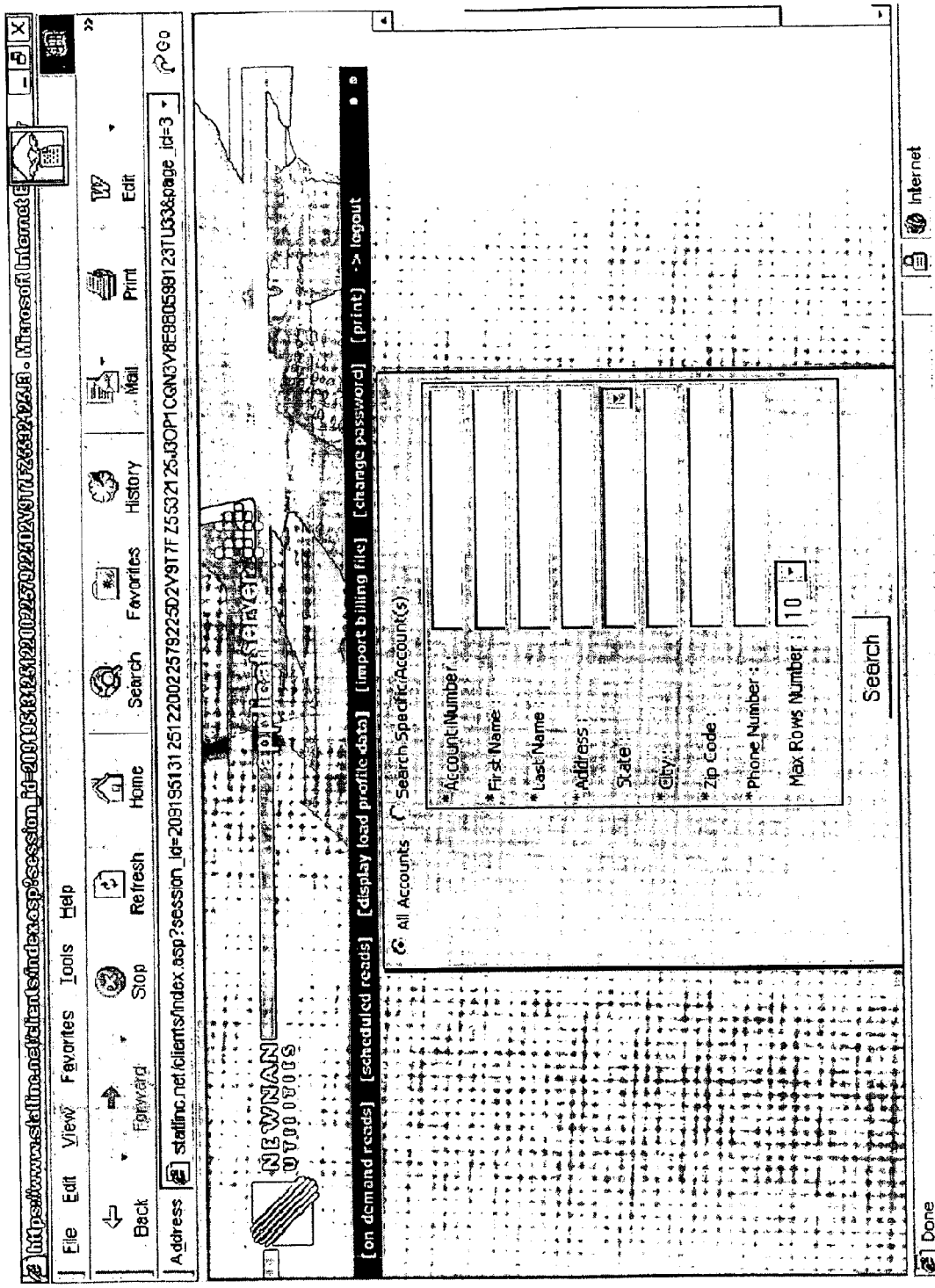
FIG. 10 is a screen view that illustrates an account selection screen view showing various information fields.

As shown in block 608, once the user has selected a desired option, in the instant case the user selected display load profile data, the user is presented with an account selection screen view, as shown in FIG. 10. The account selection screen allows the user to tailor select those accounts for which data will be displayed based on information provided in one or more information fields. Information fields may include account number, first name, last name, address, state, city, zip code, phone number, and max rows number, as shown. As an example, to select a desired number of accounts from a given city, the city name would be entered in the city information field and desired number of accounts would be entered in the max rows number field. The list of accounts could be further tailored by entering information in the other information fields. Preferably, only certain users have access to various accounts. Access could be easily tracked by data stored in memory 414 or on the web server database 170 (FIG. 4). However, in the present example, it is only necessary to access one account.

Figure 11:
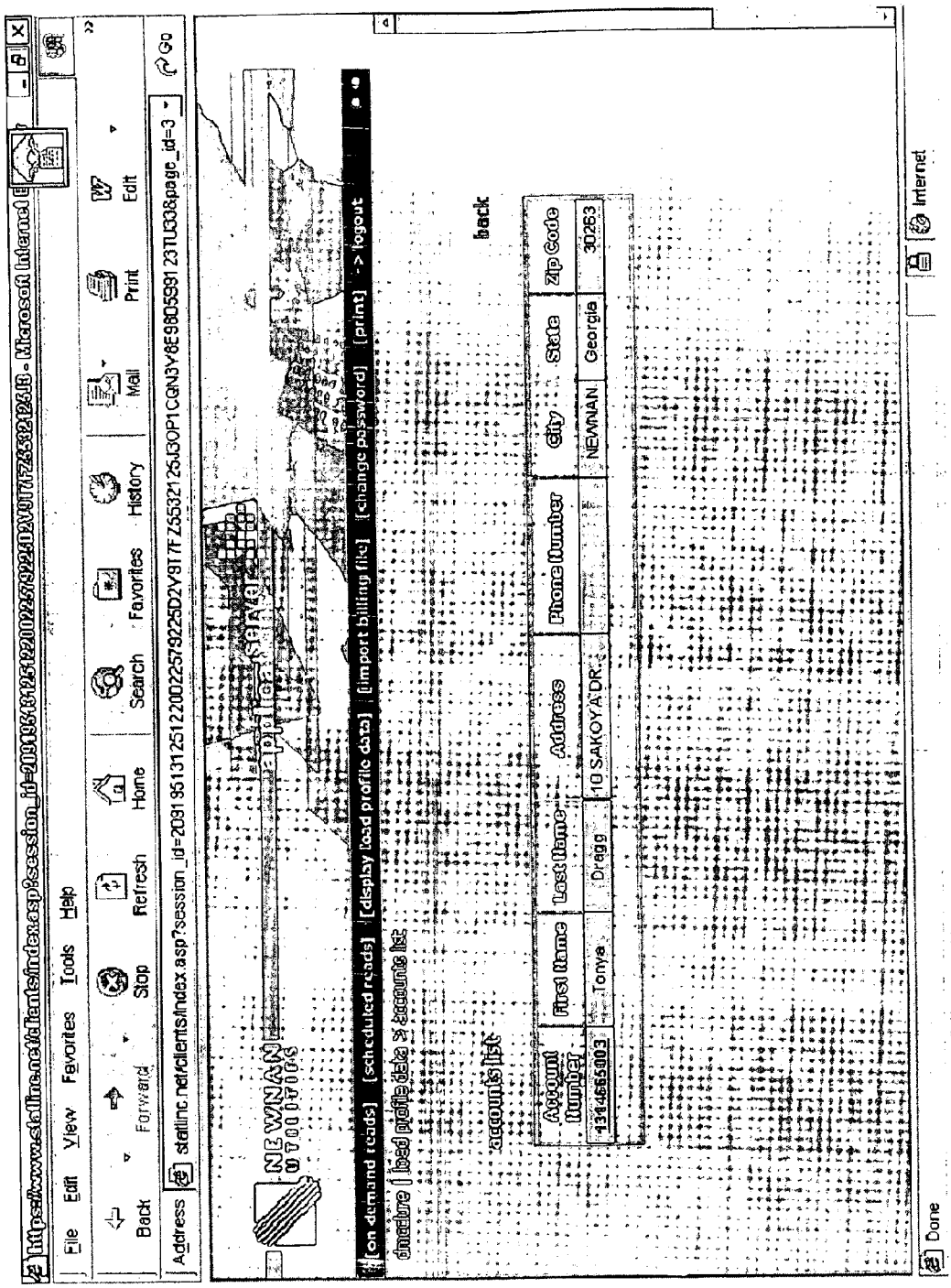
FIG. 11 is a screen view that illustrates an account list screen view displaying accessible accounts.

As shown in block 610, once adequate account selection information has been entered and accepted, the user is presented with an accounts list screen view that displays the accessible accounts, as shown in FIG. 11. The accounts list includes an account number field in addition to the same first name, last name, address, phone number, city, state, and zip code fields discussed in connection with the account selection screen view (FIG. 10). However, these information fields now contain information specific to the associated account number shown.

Figure 12:
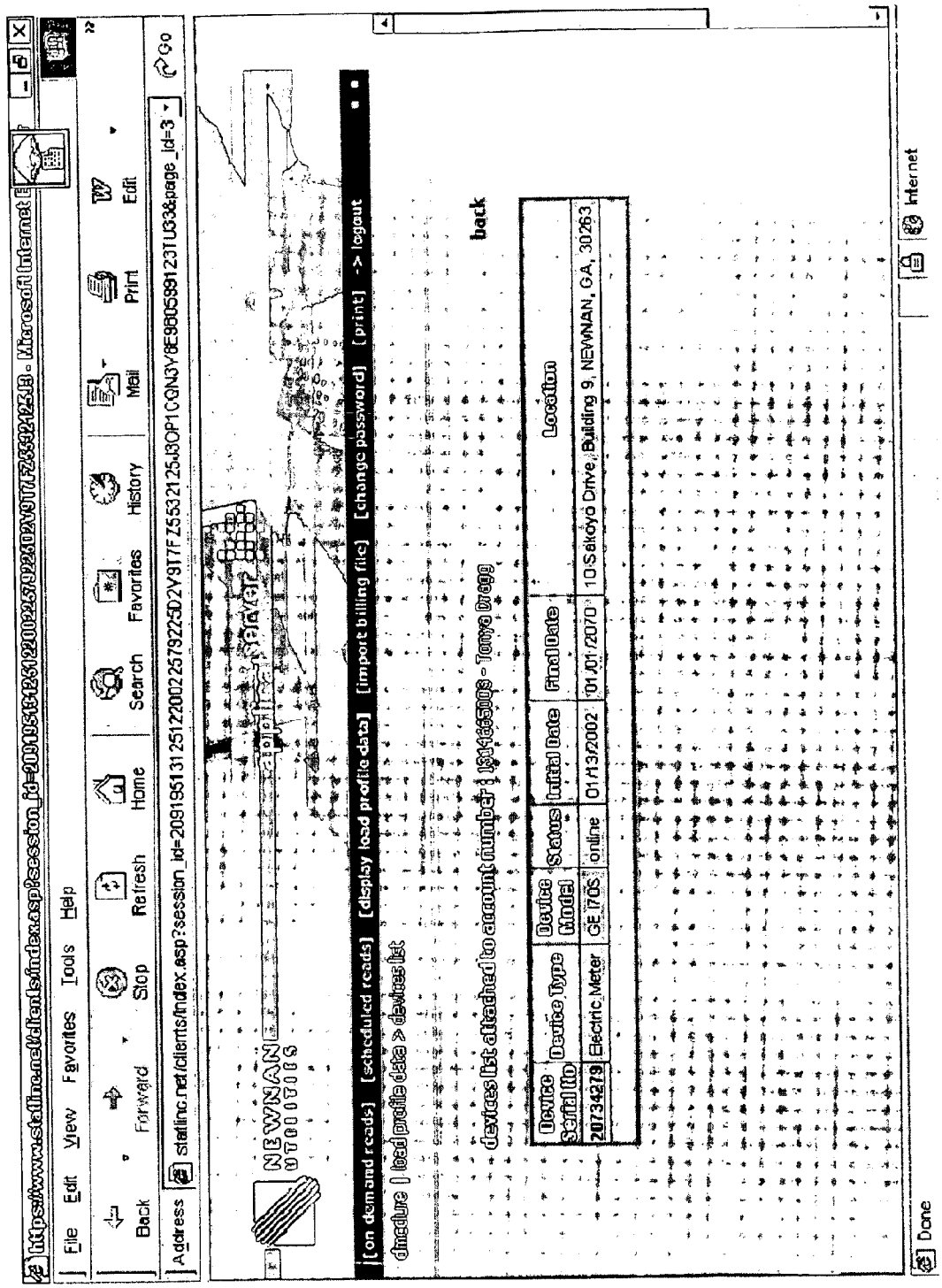
FIG. 12 is a screen view that illustrates a devices list screen view showing utility measurement devices that are associated with the access account.

As shown in block 612, in response to the user selecting the desired account number, the user is provided with a devices list screen view (FIG. 12) that shows all of the utility measurement devices that are associated with the account number of interest and for which utility consumption data is available. As shown, only one device, an electric meter, is associated with the selected account number. However, multiple devices, such as water meters, gas meters, etc., could also be listed for each account number. Once again, various information fields, such as device model, status, location, etc., can be provided.

Figure 13:
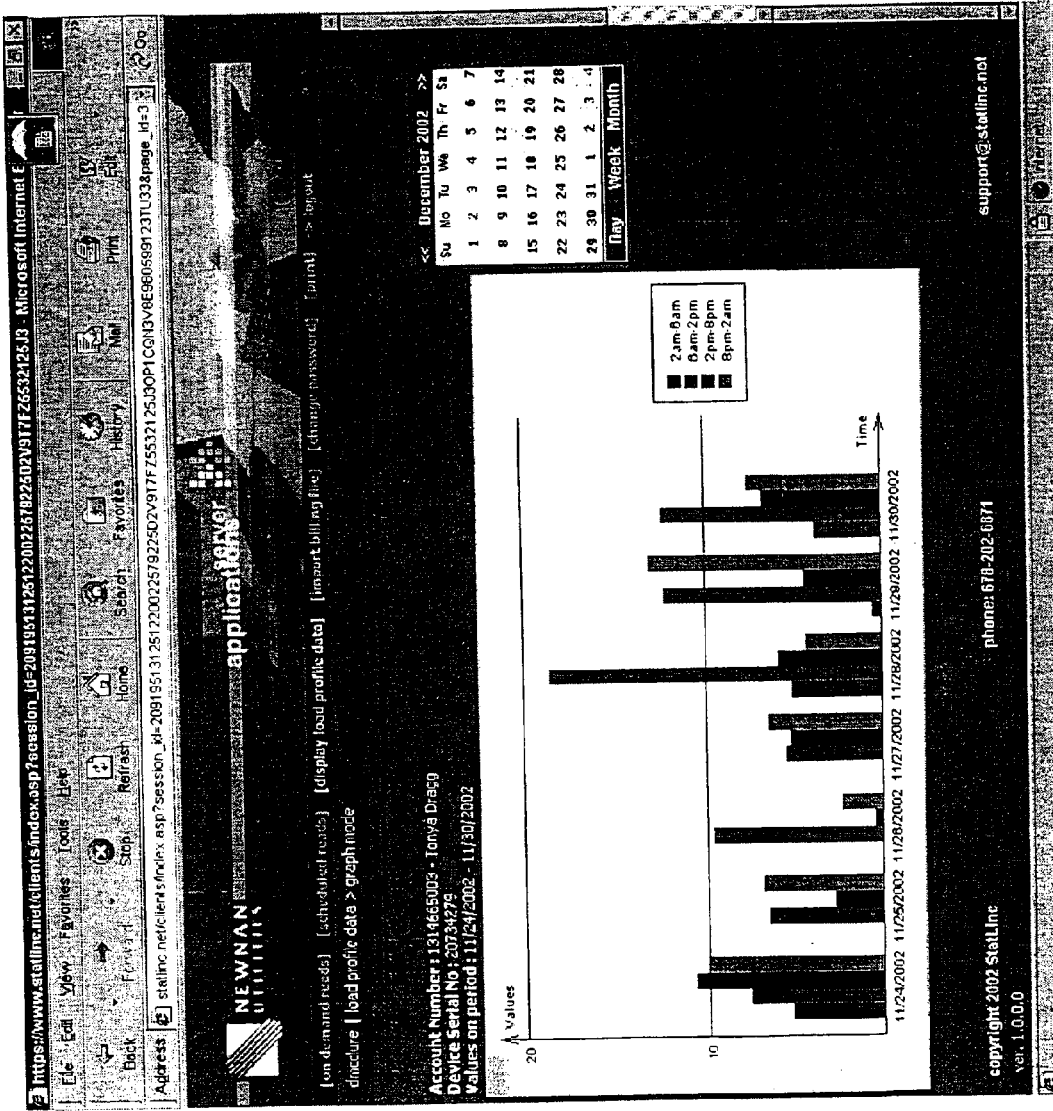
FIG. 13 is a screen view that illustrates a data display screen view that displays utility consumption data in a time-segmented fashion.

As shown in block 614, utility consumption data is provided to the user in response to the user's selection of one of the listed devices. In the instant case, the desired device selected by using the cursor, as is known in the art. FIG. 13 provides an example of a data display screen view wherein the data is displayed in a time-segmented fashion. As shown, the data is segmented into kilowatt hours consumed over six hour time segments, and displayed in bar graph form. Preferably, a time segment used to display the desired data consists of an integer multiple of a single hour, i.e., a four hour or six hour time segment. As well, it is preferable that the time segment is selected such that an integer number of time segments exist for a twenty-four hour time interval. A legend 1310 is provided that relates the shades, or colors, of each bar in the graph to each segment of time represented. The time interval over which the data is displayed is the week of July 28 through August 3. However, the interval over which the data is displayed could be selected by the user. In the instant example, a calendar 1320 is provided on the screen view that permits the user to select varying time intervals over which data will be displayed. For example, a particular day may be selected with the cursor by choosing the desired numeral. The data for the week that includes the selected day may then be chosen by selecting the phrase "week" the bottom of the calendar 1320 with the cursor. Similarly, the data for the month including the selected day may be chosen by selecting the phrase "month" at the bottom of the calendar. Preceding or succeeding months may be selected using the sets of double arrows displayed at the top of the calendar 1320. Example screen views of utility consumption data bar graphs for the day, week, and month time intervals are shown in FIGS. 14, 13, and 15, respectively.

Figure 14:
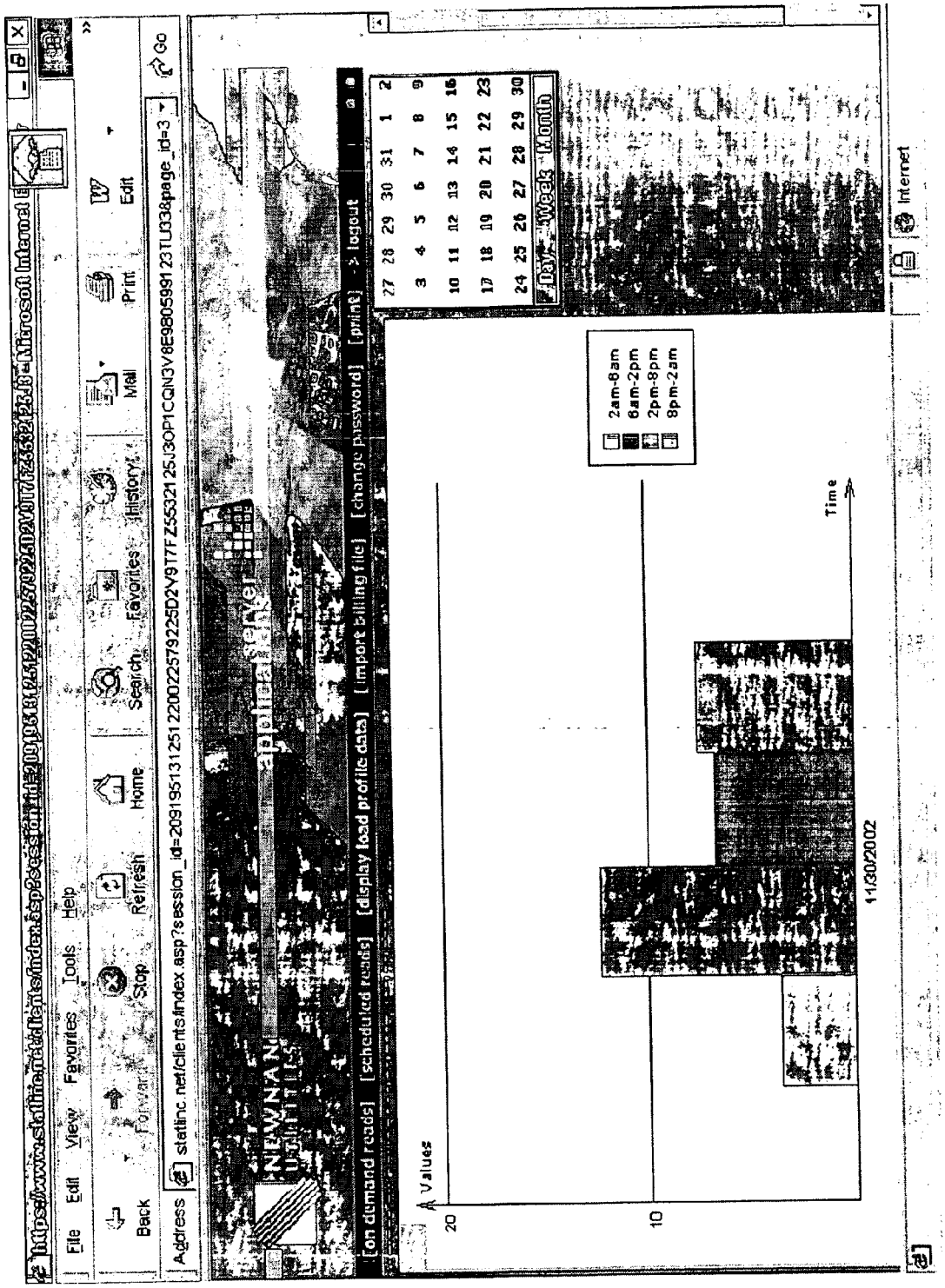
FIG. 14 is a screen view that illustrates a data display screen view wherein utility consumption data is displayed in a time-segmented fashion.
Figure 15:
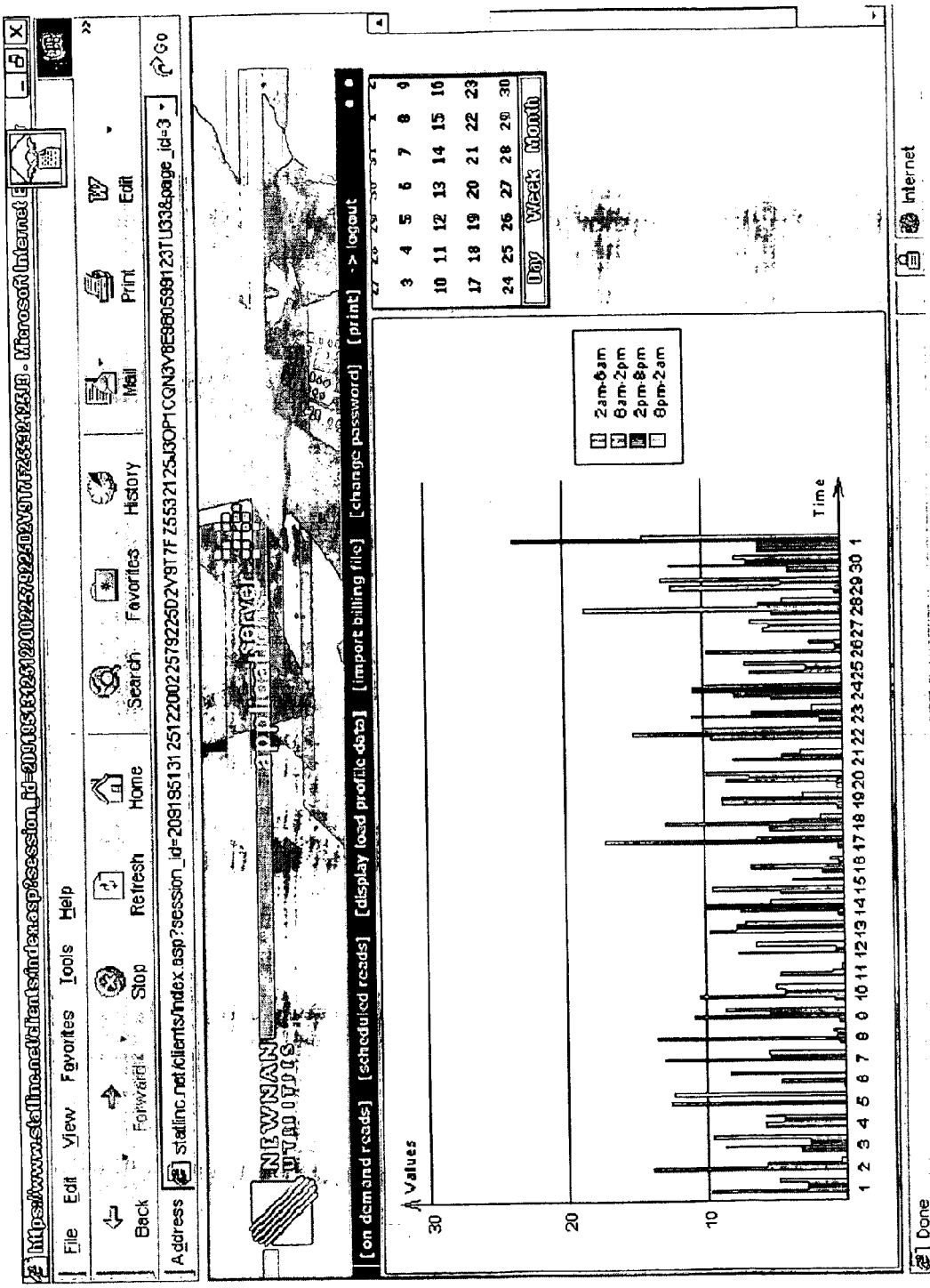
FIG. 15 is a screen view that illustrates a data display screen view wherein utility consumption data is displayed in a time-segmented fashion.

Note, the day, week, month time intervals, and six hour time segments used to display the utility consumption data in FIGS. 13–15 are only exemplary and are not intended to limit the present invention to those intervals and segments only. As well, the calendar 1320 shown in FIGS. 13–15 is not intended to limit the method of selecting the desired time interval. For example, embodiments are envisioned wherein the user could enter the dates of interest for a given interval directly into an interval information filed (not shown).

Figure 16:
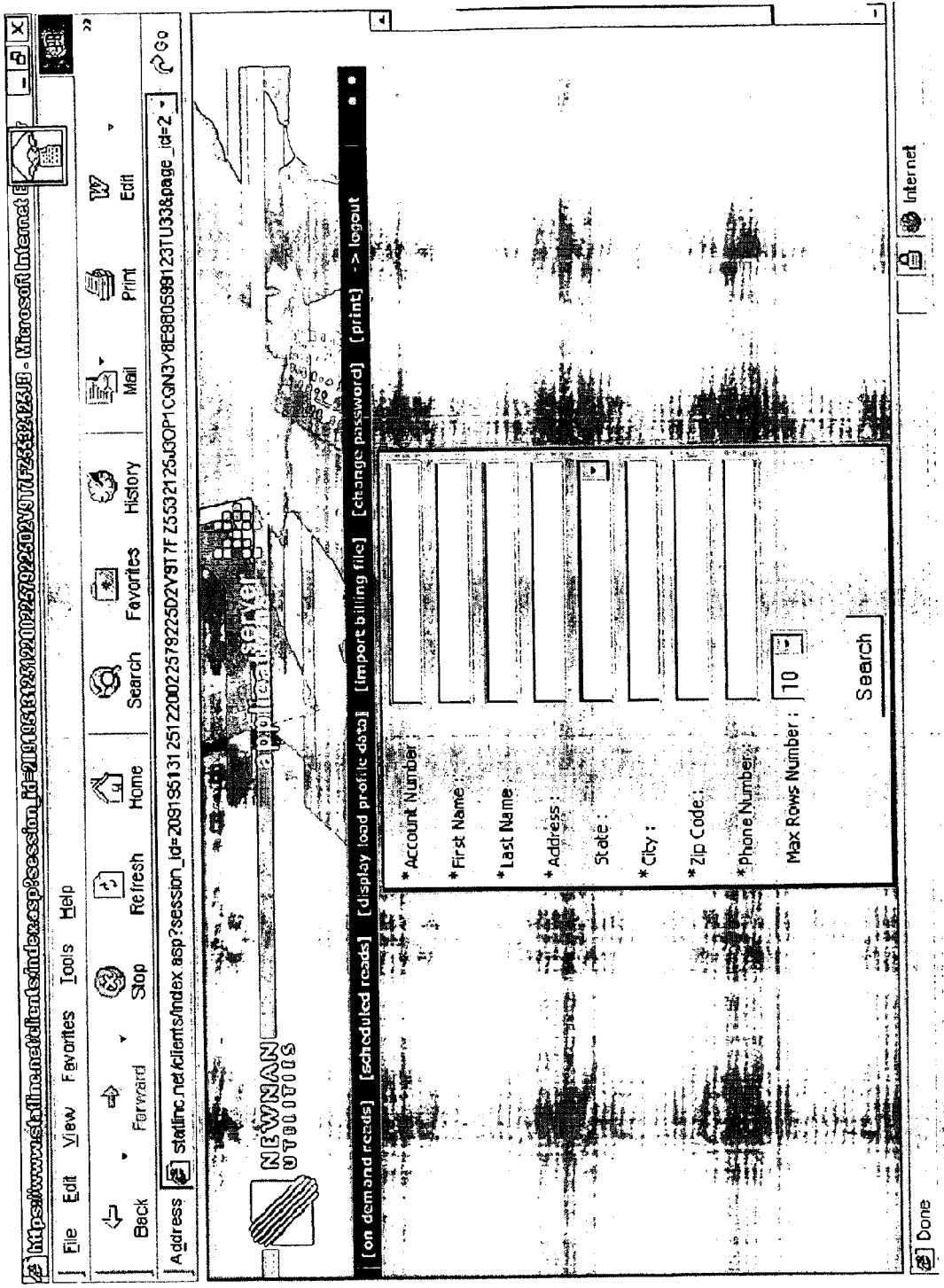
FIG. 16 is a screen view that illustrates an example of an account selection screen view including various information fields.
Figure 17:
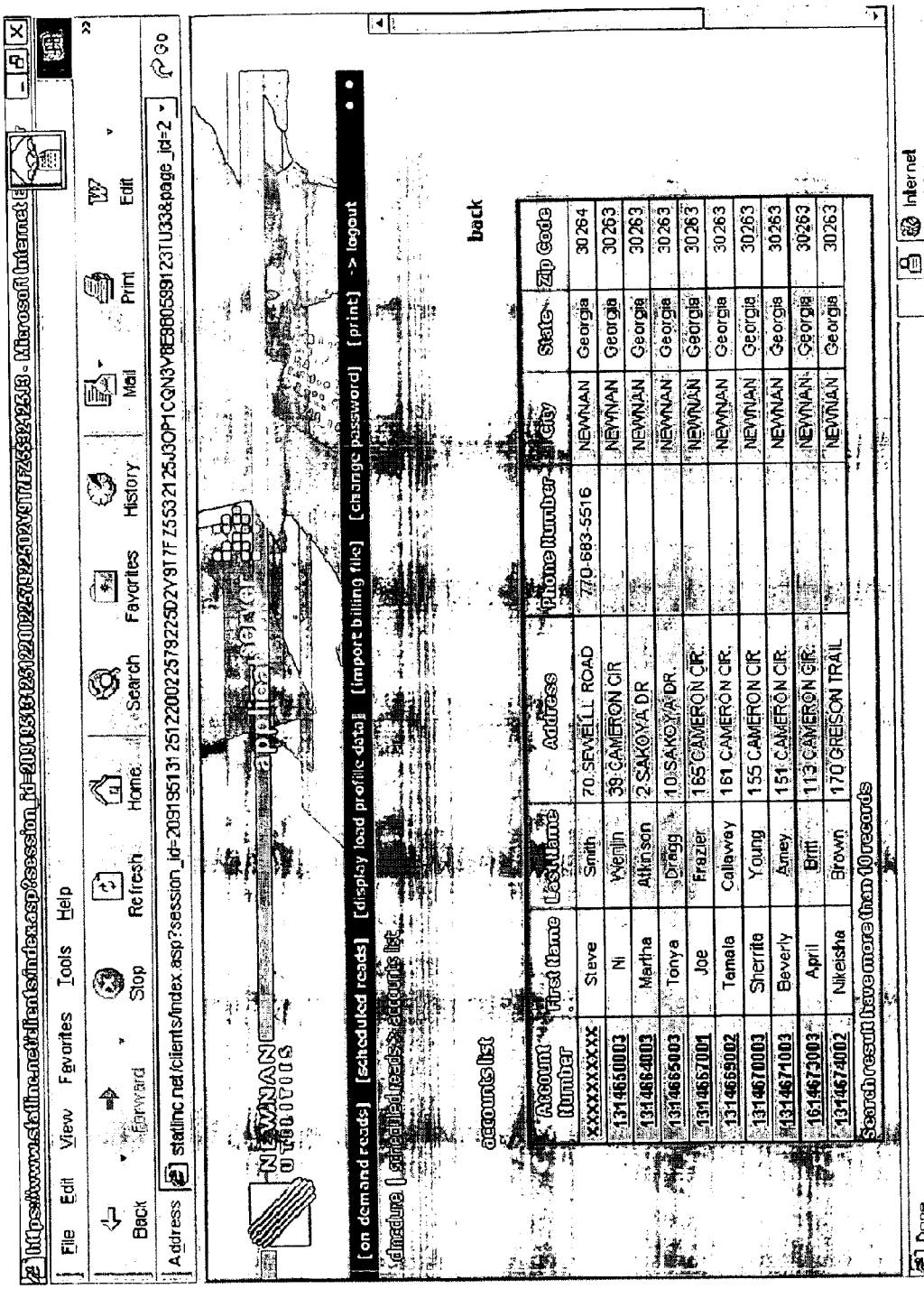
FIG. 17 is a screen view that illustrates an example of an account list screen view that displays accessible accounts.

To change data display options, the user merely selects the next option of interest with the cursor. For example, in response to selecting the scheduled reads option, the user is presented with an account selection screen view as shown in FIG. 16, that is similar to that shown in FIG. 10, and as such, will not be covered in depth. However, in the instant example, the user enters selection information only in the max rows number information field. Therefore the user will receive a list of account numbers up to the number entered, provided the user has access to that number of accounts. Once again, preferably, access is determined by the monitoring system. In response to the present request, the user receives a list of ten account numbers, and their associated information fields, as shown in the accounts list screen view shown in FIG. 17.

Figure 18:
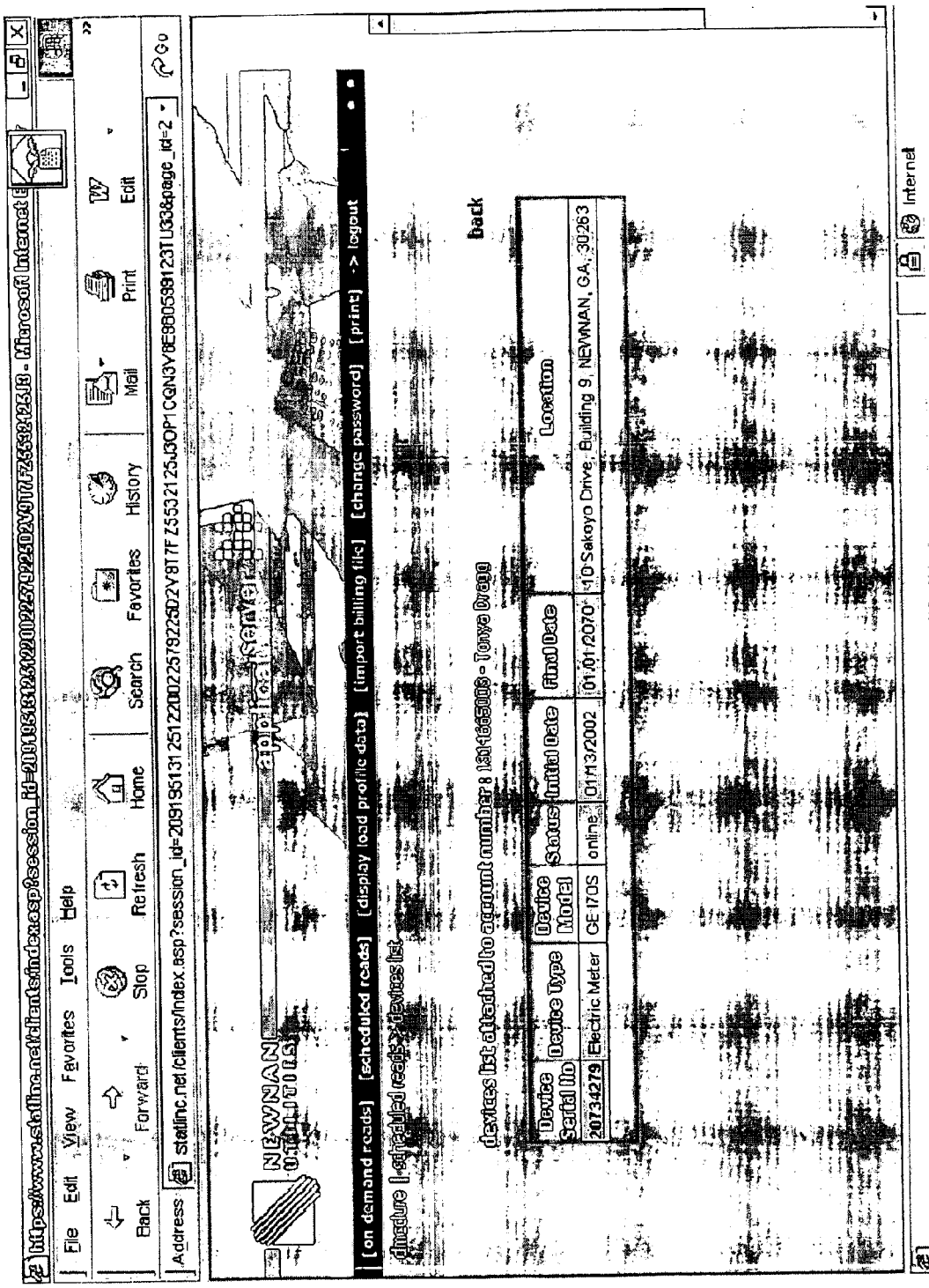
FIG. 18 is a screen view that illustrates an example of a devices list screen view that shows utility measurement devices that are associated with an accessible account.
Figure 19:
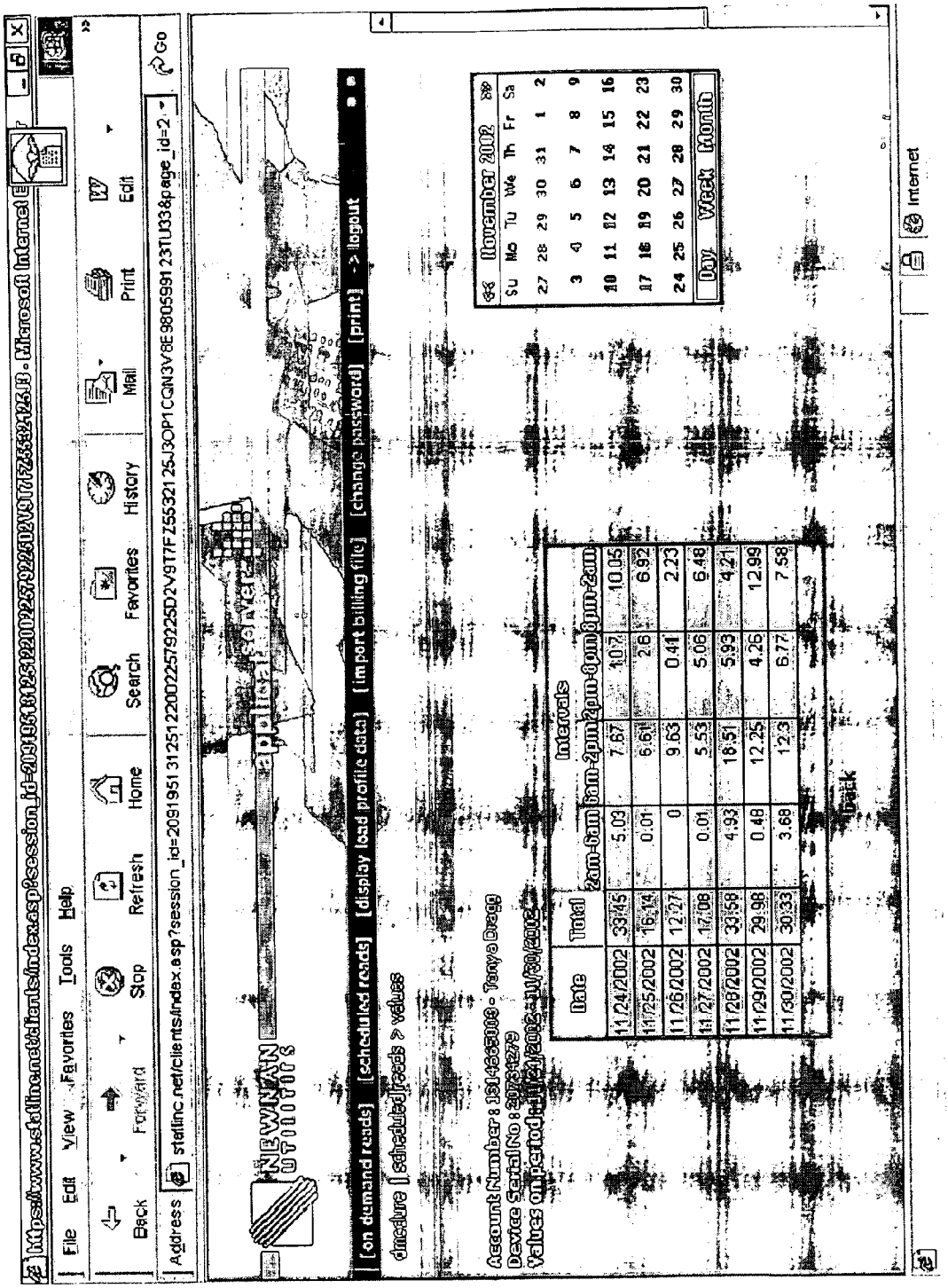
FIG. 19 is a screen view that illustrates an example of a data display screen view wherein utility consumption data is displayed in a time-segmented fashion.

Once again, in response to the user selecting the desired account number with the cursor, the user is provided with a devices list screen view, FIG. 18, that shows all the utility measurement devices associated with the selected account number. By selecting the desired device, the user is provided with a data display screen view, as shown in FIG. 19, that shows utility consumption data in a time-segmented fashion over a given time interval. As in the preceding example, the desired time interval can be changed. As well, the utility data is divided into six hour segments. However, the utility consumption data is now provided in a tabular form, vice bar graph form. As well, a total value of utility consumption for each twenty-four hour period is provided.

Figure 20:
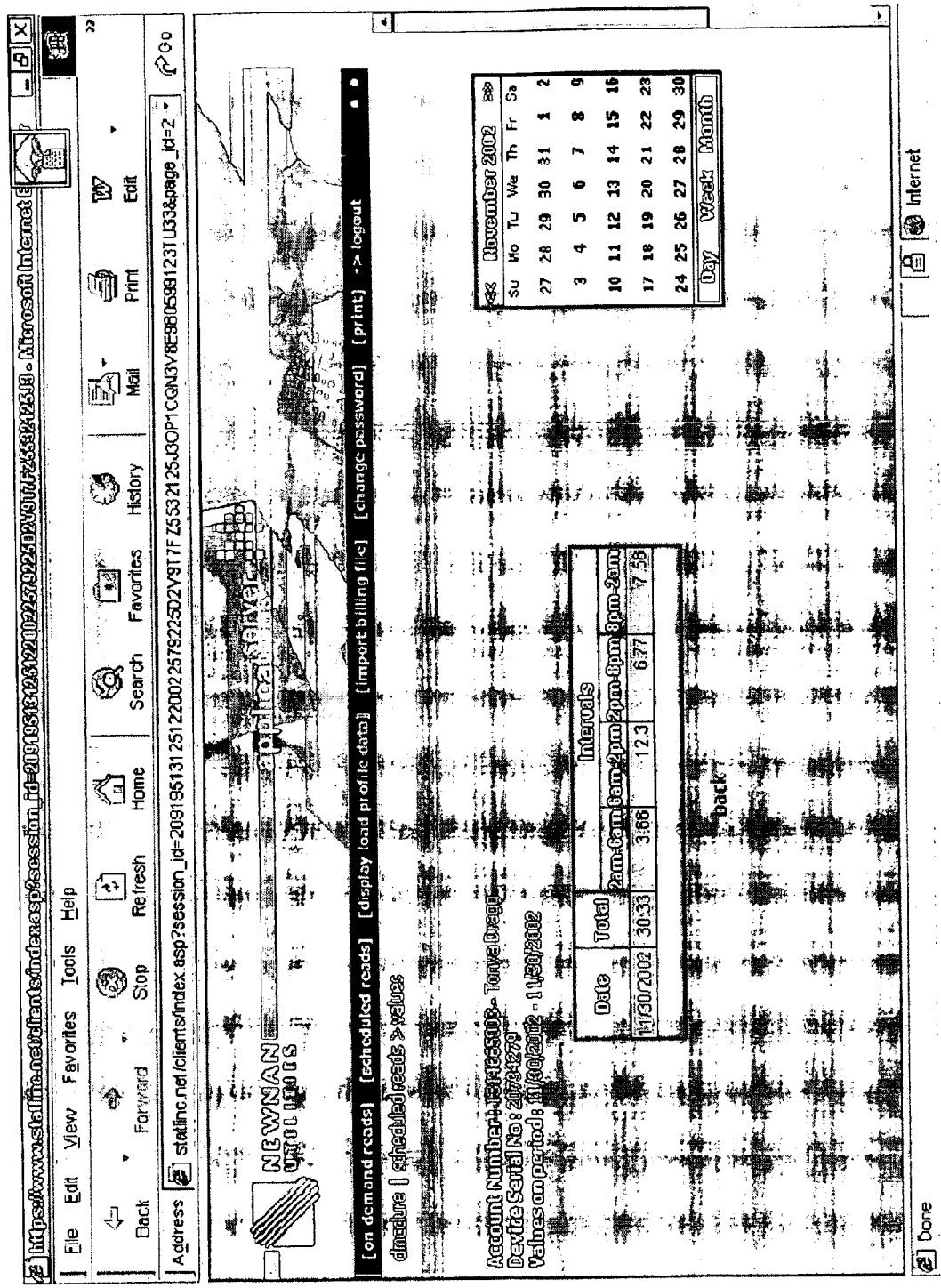
FIG. 20 is a screen view that illustrates an example of a data display screen view wherein utility consumption data is displayed in a time-segmented fashion.
Figure 21:
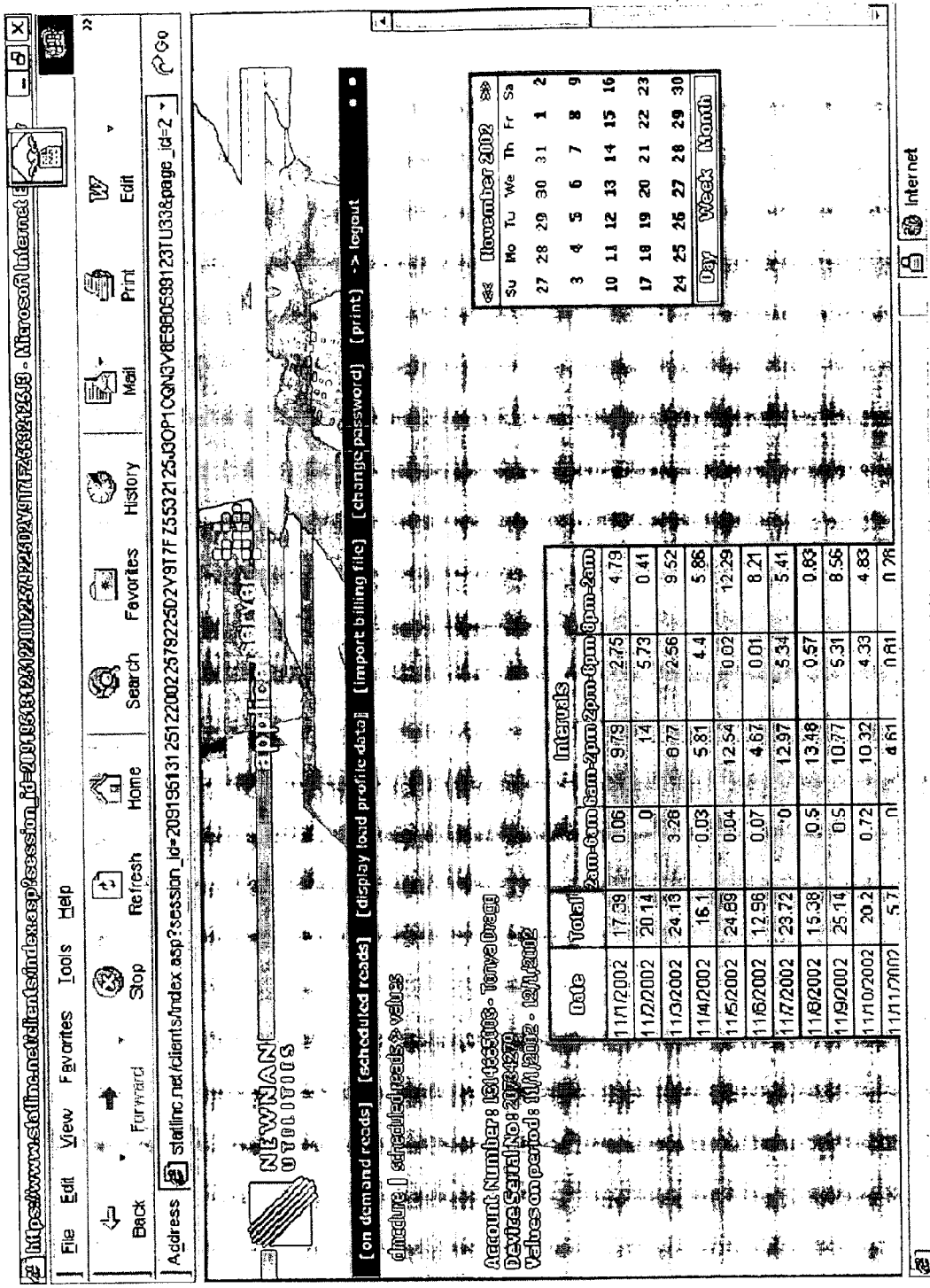
FIG. 21 is a screen view that illustrates an example of a data display screen view wherein utility consumption data is displayed in a time-segmented fashion.

Example screen views of utility consumption tables for the day, week, and month time intervals are shown in FIGS. 20, 19 and 21, respectively. The time segments and intervals used in the example are not intended to limit the scope of the present invention in any way. Moreover, embodiments of the present invention are envisioned wherein the utility consumption data is displayed in forms other than bar graphs and tables, i.e., pie charts, etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for monitoring utility consumption information, the system comprising:
a plurality of wireless transceivers dispersed geographically and coupled to a utility meter, each transceiver configured to receive utility consumption information transmitted from a nearby transceiver and further configured to retransmit the utility consumption information;

a gateway transceiver coupled to a wide area network and configured to receive the utility consumption information and transmit a message containing the utility consumption information over the wide area network;

a memory to store utility consumption information received over wide area network; and a processor configured by the memory to provide a user interface that presents the utility consumption information in a time-segmented fashion.

2. The system of claim 1, wherein a time segment for which the utility consumption information is displayed is an integer multiple of an hour, and an integer number of the time segments are divisible into a twenty-four hour interval.

3. The system of claim 1, wherein the processor and the memory are resident in an internet server.

4. The system of claim 1, wherein the processor and memory are resident in a user's computer.

5. The system of claim 1, wherein the user interface is configured to enable the user to select a time interval for which to view the time-segmented utility consumption information.

6. The system of claim 1, wherein the utility consumption information corresponds to a utility selected from a group consisting of electricity, water and natural gas.

7. The system of claim 1, wherein the user interface is configured to display the utility consumption information in a table.

8. The system of claim 1, wherein the user interface is configured to display the utility consumption information in a bar graph.

9. The system of claim 1, wherein the user interface is configured to enable a user to select the utility consumption information to be viewed by selecting an identifier that identifies a utility measuring device.

10. The system of claim 9, wherein the user interface is configured to responsively display the utility user information resulting from selecting the identifier.

11. A method for presenting utility consumption information, the method comprising:

receiving a message communicated over a wide area network from a gateway transceiver coupled to the wide area network, the gateway transceiver being configured to receive a wireless transmission containing the utility consumption information from a wireless transceiver coupled to a utility meter, wherein the wireless transmission may be repeated by one or more additional wireless transceivers coupled to a utility meter and one or more wireless transceivers not coupled to a utility meter;

providing a user interface to a user to display the utility consumption information, wherein the utility consumption information characterizes consumption related to an identified utility meter;

segmenting the utility consumption information; and displaying the utility consumption information in a time-segmented fashion.

12. The method of claim 11 wherein a time-segment in which the utility consumption information is segmented comprises an integer multiple of an hour, and an integer number of time segments are divisible into a twenty-four hour interval.

13. The method of claim 11, wherein the segmenting step further comprises segmenting the utility consumption information in response to the user selecting a time interval for which utility consumption information is desired, wherein the time interval is selected from the user interface.

14. The method of claim 13, wherein the time interval is selected from a group consisting of a day, a week, a month, and a year.

15. The method of claim 11, wherein the providing step further comprises allowing the user to select the utility meter for which the utility consumption information is displayed by selecting an identifier displayed on the user interface that identifies the utility meter.

16. The method of claim 11, wherein the displaying step further comprises displaying the utility consumption information in a table.

17. The method of claim 11, wherein the displaying step further comprises displaying the utility consumption information in a bar graph.

18. The method of claim 11, wherein the providing step further comprises providing utility consumption information corresponding to a utility selected from the group consisting of electricity, water and natural gas.

19. A computer program embodied in a computer readable medium for monitoring utility consumption information, the computer program comprising:

logic configured to receive a message communicated over a wide area network from a gateway transceiver coupled to the wide area network, the gateway transceiver being configured to receive a wireless transmission containing the utility consumption information from a wireless transceiver coupled to a utility meter, wherein the wireless transmission may be repeated by one or more additional wireless transceivers coupled to a utility meter and one or more wireless transceivers not coupled to a utility meter;

logic configured to provide a user interface to a user to display utility consumption information, wherein the utility consumption information characterizes consumption related to an identified utility meter;

logic configured to segment the utility consumption information; and logic configured to display the utility consumption information in a time-segmented fashion.

20. The computer program of claim 19, wherein the logic configured to segment is further configured to segment the utility consumption information into a plurality of time segments, each time segment being an integer interval of an hour, and wherein an integer number of time segments are divisible into a twenty-four hour interval.

21. The computer program of claim 19, further comprising logic configured to segment the utility consumption information in response to the user selecting a time interval for which utility consumption information is desired, wherein the time interval is selected from the user interface.

22. The computer program of claim 21, wherein the time interval is selected from a group consisting of a day, a week, a month, and a year.

23. The computer program of claim 19, further comprising logic configured to allow the user to select the utility meter for which the utility consumption information is displayed by selecting an identifier displayed on the user interface that identifies the utility meter.

24. The computer program of claim 19 further comprising logic configured to display the utility consumption information in a table.

25. The computer program of claim 19 further comprising logic configured to display utility consumption information in a bar graph.

* * * * *